(12) United States Patent
Rieder et al.

(10) Patent No.: US 7,360,453 B2
(45) Date of Patent: Apr. 22, 2008

(54) IN-LINE MEASURING DEVICES AND METHOD FOR COMPENSATION MEASUREMENT ERRORS IN IN-LINE MEASURING DEVICES

(75) Inventors: Alfred Rieder, Landshut (DE); Wolfgang Drahm, Friesing (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/645,562

(22) Filed: Dec. 27, 2006

(65) Prior Publication Data

US 2007/0186686 A1 Aug. 16, 2007

Related U.S. Application Data

(60) Provisional application No. 60/755,769, filed on Jan. 4, 2006.

(30) Foreign Application Priority Data

Dec. 27, 2005 (EP) .................................. 0502848

(51) Int. Cl.
*G01F 1/84* (2006.01)
(52) U.S. Cl. ................................ 73/861.357
(58) Field of Classification Search ........... 73/861.355, 73/861.356, 861.357
See application file for complete search history.

(56) References Cited

U.S. PATENT DOCUMENTS

| | | | |
|---|---|---|---|
| 4,187,721 A | 2/1980 | Smith | |
| 4,491,025 A | 1/1985 | Smith | |
| 4,524,610 A | 6/1985 | Fitzgerald | |
| 4,660,421 A | 4/1987 | Dahlin | |
| 4,733,569 A | 3/1988 | Kelsey | |
| 4,876,898 A | 10/1989 | Cage | |
| 4,891,991 A | 1/1990 | Mattar | |
| 5,069,074 A | 12/1991 | Young | |
| 5,218,873 A | 6/1993 | Lang | |

(Continued)

FOREIGN PATENT DOCUMENTS

DE 10 2004 014 029 A1 10/2005

(Continued)

OTHER PUBLICATIONS

U.S. Appl. No. 11/645,059, Alfred Reider, filed Dec. 26, 2006.*

(Continued)

*Primary Examiner*—Jewel Thompson
(74) *Attorney, Agent, or Firm*—Bacon & Thomas, PLLC

(57) ABSTRACT

The measuring device comprises, for measuring multi phase mixture, a vibratory-type transducer and a measuring device electronics electrically coupled with the vibratory-type transducer. The transducer includes at least one measuring tube inserted into the course of the pipeline. An exciter arrangement acts on the measuring tube for causing the at least one measuring tube to vibrate. A sensor arrangement senses vibrations of the at least one measuring tube and delivers at least one oscillation measurement signal representing oscillations of the measuring tube. Further, the measuring device electronics delivers an excitation current driving the exciter arrangement. The measuring device is adapted to compensating measurement errors, induced due to the presence of multi phase mixture, based on a movin resonator model (MRM).

31 Claims, 17 Drawing Sheets

U.S. PATENT DOCUMENTS

| | | | |
|---|---|---|---|
| 5,253,533 A | 10/1993 | Lam |
| 5,301,557 A | 4/1994 | Cage |
| 5,423,225 A | 6/1995 | Cage |
| 5,531,126 A | 7/1996 | Drahm |
| 5,602,345 A | 2/1997 | Wenger |
| 5,602,346 A | 2/1997 | Kitami |
| 5,616,868 A | 4/1997 | Hagenmeyer |
| 5,734,112 A | 3/1998 | Bose |
| 5,796,011 A | 8/1998 | Keita |
| 5,869,770 A | 2/1999 | Yoshimura |
| 6,006,609 A | 12/1999 | Drahm |
| 6,092,409 A | 7/2000 | Patten |
| 6,311,136 B1 | 10/2001 | Henry |
| 6,505,519 B2 | 1/2003 | Henry |
| 6,513,393 B1 | 2/2003 | Eckert |
| 6,556,931 B1 | 4/2003 | Hays |
| 6,636,815 B2 | 10/2003 | Keilty |
| 6,651,513 B2 | 11/2003 | Wenger |
| 6,691,583 B2 | 2/2004 | Rieder |
| 6,745,135 B2 | 6/2004 | Keilty |
| 6,840,109 B2 | 1/2005 | Drahm |
| 6,880,410 B2 | 4/2005 | Drahm |
| 6,910,366 B2 | 6/2005 | Drahm |
| 7,017,424 B2 | 3/2006 | Rieder |

FOREIGN PATENT DOCUMENTS

| | | |
|---|---|---|
| DE | 10 2004 021 690 A1 | 11/2005 |
| EP | 0 553 939 A2 | 8/1993 |
| EP | 1 001 254 A1 | 4/2000 |
| EP | 1 109 016 A2 | 6/2001 |
| EP | 1 281 938 A2 | 2/2003 |
| EP | 1 291 639 A1 | 3/2003 |
| JP | 10281846 A | 10/1998 |
| WO | WO 88/03261 | 5/1988 |
| WO | WO 95/16897 | 6/1995 |
| WO | WO 98/07009 | 2/1998 |
| WO | WO 99/39164 | 8/1999 |
| WO | WO 00/57141 | 9/2000 |
| WO | WO 01/33174 A1 | 5/2001 |
| WO | WO 02/37063 A2 | 5/2002 |
| WO | WO 00/36379 | 6/2003 |
| WO | WO 03/076880 A1 | 9/2003 |
| WO | WO 03/095949 A1 | 11/2003 |
| WO | WO 03/095950 A1 | 11/2003 |

OTHER PUBLICATIONS

Alfred Rieder, Wolfgang Drahm and Hao Zhu, Coriolis Mass Flowmeters: On Measurement Errors In Two-Phase Conditions, Paper 3.4, Proceedings of Flowmeko 2005, XP009083045 Jun. 2005.

* cited by examiner

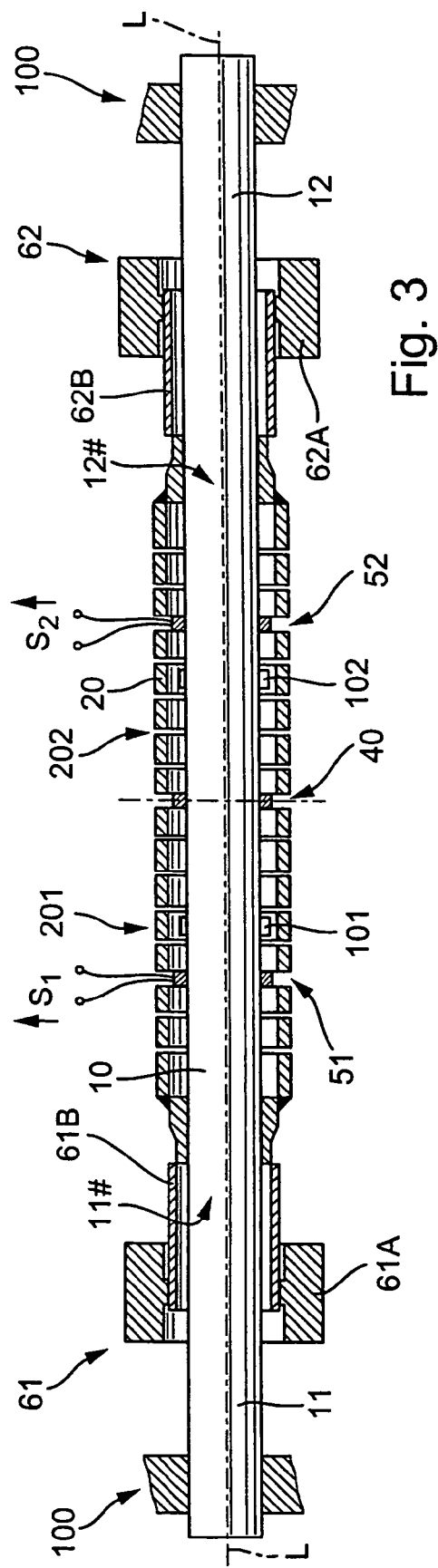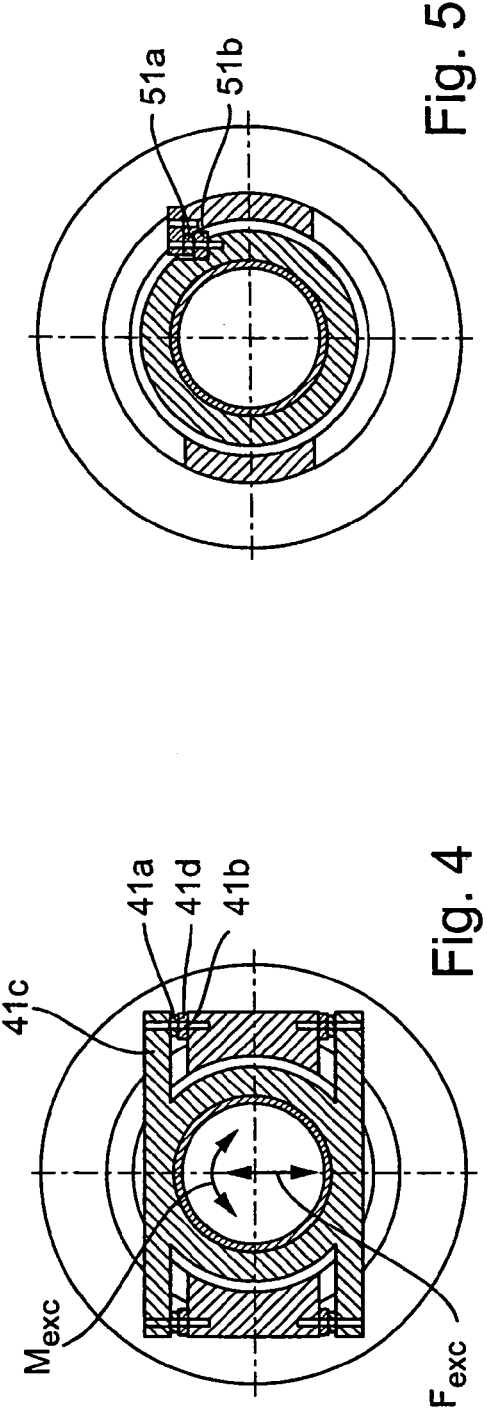

1 : Sound Speed Sensor
2 : Pressure Sensor

1 : Air Dispenser

2 : Pressure Sensor

IN-LINE MEASURING DEVICES AND METHOD FOR COMPENSATION MEASUREMENT ERRORS IN IN-LINE MEASURING DEVICES

This application is a nonprovisional application based on U.S. Provisional Application No. 60/755,769 which was filed on Jan. 4, 2006.

FIELD OF THE INVENTION

The invention relates to an In-line measuring device having a transducer of the vibratory-type, especially a Coriolis mass-flow/density measuring device for a medium, especially a two, or more, phase medium flowing in a pipeline, as well as a method for producing by means of such a vibratory transducer a measured value representing a physical, measured quantity of the medium, for example a mass flow rate, a density and/or a viscosity. Further, the invention relates to a method for compensation, in such In-line measuring devices, measurement errors caused by two-phase or multi-phase mixtures.

BACKGROUND OF THE INVENTION

In the technology of process measurements and automation, the measurement of physical parameters of a medium flowing in a pipeline, parameters such as e.g. the mass flow rate, density and/or viscosity, such inline measuring devices, especially Coriolis mass flow measuring devices, are used, which bring about reaction forces in the medium, such as e.g. Coriolis forces corresponding to the mass flow rate, inertial forces corresponding to the density, or frictional forces corresponding to the viscosity, etc., by means of a transducer of the vibratory-type—hereinafter vibratory transducer—inserted into the course of the pipeline carrying the medium and traversed during operation by the medium, and by means of a measurement and operating circuit connected therewith. Derived from these reaction forces, the measuring devices then produce a measurement signal representing the particular mass flow rate, the particular viscosity and/or the particular density of the medium. Inline measuring devices of this type, utilizing a vibratory transducer, as well as their manner of operation, are known per se to those skilled in the art and are described in detail in e.g. WO-A 03/095950, WO-A 03/095949, WO-A 03/076880, WO-A 02/37063, WO-A 01/33174, WO-A 00/57141, WO-A 99/39164, WO-A 98/07009, WO-A 95/16897, WO-A 88/03261, US 2003/0208325, U.S. Pat. No. 6,745,135, U.S. Pat. No. 6,691,583, U.S. Pat. No. 6,651,513, U.S. Pat. No. 6,636,815, U.S. Pat. No. 6,513,393, U.S. Pat. No. 6,505,519, U.S. Pat. No. 6,311,136, U.S. Pat. No. 6,006,609, U.S. Pat. No. 5,869,770, U.S. Pat. No. 5,796,011, U.S. Pat. No. 5,616,868, U.S. Pat. No. 5,602,346, U.S. Pat. No. 5,602,345, U.S. Pat. No. 5,531,126, U.S. Pat. No. 5,301,557, U.S. Pat. No. 5,253,533, U.S. Pat. No. 5,218,873, U.S. Pat. No. 5,069,074, U.S. Pat. No. 4,876,898, U.S. Pat. No. 4,733,569, U.S. Pat. No. 4,660,421, U.S. Pat. No. 4,524,610, U.S. Pat. No. 4,491,025, U.S. Pat. No. 4,187,721, EP-A 1 291 639, EP-A 1 281 938, EP-A 1 001 254 or EP-A 553 939.

For guiding the medium, the vibratory transducers include at least one measuring tube with a straight tube segment held in a, for example, tubular or box-shaped, support frame. For producing the above-mentioned reaction forces during operation, the tube segment is caused to vibrate, driven by an electromechanical exciter arrangement. For registering vibrations of the tube segment, particularly at its inlet and outlet ends, the vibratory transducers additionally include an electrophysical sensor arrangement reacting to motions of the tube segment.

In the case of Coriolis mass flow measuring devices, the measurement of the mass flow rate of a medium flowing in a pipeline rests, for example, on having the medium flow through the measuring tube inserted into the pipeline and oscillating during operation laterally to a measuring tube axis, whereby Coriolis forces are induced in the medium. These, in turn, effect that the inlet and outlet end regions of the measuring tube oscillate shifted in phase relative to one another. The magnitude of this phase shift serves as a measure of the mass flow rate. The oscillations of the measuring tube are, to this end, registered by means of two oscillation sensors of the above-mentioned sensor arrangement separated from one another along the length of the measuring tube and are transformed into oscillation measurement signals, from whose phase shift relative to one another the mass flow rate is derived.

Already the U.S. Pat. No. 4,187,721 mentions, further, that the instantaneous density of the flowing medium can also be measured by means of such inline measuring devices, and, indeed, on the basis of a frequency of at least one of the oscillation measurement signals delivered from the sensor arrangement. Moreover, usually also a temperature of the medium is directly measured in suitable manner, for example by means of a temperature sensor arranged on the measuring tube. Additionally, straight measuring tubes can, as is known, upon being excited to torsional oscillations about a torsional oscillation axis extending essentially parallel to, or coinciding with, the longitudinal axis of the measuring tube, effect that radial shearing forces are produced in the medium as it flows through the tube, whereby significant oscillation energy is withdrawn from the torsional oscillations and dissipated in the medium. As a result of this, a considerable damping of the torsional oscillations of the oscillating measuring tube occurs, so that, additionally, electrical exciting power must be added, in order to maintain the torsional oscillations. On the basis of the electrical exciting power required to maintain the torsional oscillations of the measuring tube, the vibratory transducer can also be used to determine, at least approximately, a viscosity of the medium; compare, in this connection also U.S. Pat. No. 4,524,610, U.S. Pat. No. 5,253,533, U.S. Pat. No. 6,006,609 or U.S. Pat. No. 6,651,513. It can, consequently, assumed, without more in the following, that, even when not expressly stated, modern inline measuring devices using a vibratory transducer, especially Coriolis mass flow measuring devices, have the ability to measure, in any case, also density, viscosity and/or temperature of the medium, especially since these are always needed anyway in the measurement of mass flow rate for the compensation of measurement errors arising from fluctuating density and/or viscosity of the medium; compare, in this connection, especially the already mentioned U.S. Pat. No. 6,513,393, U.S. Pat. No. 6,006,609, U.S. Pat. No. 5,602,346, WO-A 02/37063, WO-A 99/39164 or also WO-A 00/36379.

Due to their high accuracy and their high flexibility, inline measuring devices with a vibratory transducer, especially Coriolis flowmeters, are widely used in industry for mass flow and density measurement of fluids, especially single-phase liquids or gases of such devices. Nevertehless, it is also known that the accuracies of such devices may decrease significantly, if a second phase, i.e. a plurality of gas bubbles, is mixed with the processed liquid such that the measured medium is not a pure single-phase flow. Unfortunately, even a small portion of gas may result in considerable measurement errors in liquid measurement. Consequently, in the application of inline measuring devices using a vibratory measurement-pickup, it has, however, become evident that, in the case of such inhomogeneous media, especially two, or more, phase media, the oscillation measurement signals derived from the oscillations of the measuring tube, especially also the mentioned phase shift, can be subject to fluctuations to a considerable degree, see also, for example, JP-A 10-281846, WO-A 03/076880, EP-A 1 291 639, U.S. Pat. No. 6,505,519 or U.S. Pat. No. 4,524,610. Thus, in some cases, the oscillation measurement signals can be completely unusable for the measurement of the desired physical parameters, without the use of auxiliary measures, this in spite of keeping the viscosity and density in the individual phases of the medium, as well as also the mass flow rate, practically constant and/or appropriately taking them into consideration. Such inhomogeneous media can, for example, be liquids, into which, as is e.g. practically unavoidable in dosing or bottling processes, a gas, especially air, present in the pipeline is entrained or out of which a dissolved medium, e.g. carbon dioxide, outgases and leads to foam formation. For other examples of such inhomogeneous media, emulsions and wet, or saturated, steam can be named.

As causes for the fluctuations arising in the measurement of inhomogeneous media by means of vibratory transducers, the following can be noted by way of example: the unilateral clinging or deposit of gas bubbles or solid particles, entrained in liquids, internally on the measuring tube wall, and the so-called "bubble-effect", where gas bubbles entrained in the liquid act as flow bodies for liquid volumes accelerated transversely to the longitudinal axis of the measuring tube. Especially such gas bubbles can cause significant errors. To explain this phenomenon of the bubble effect, the "bubble theory" was proposed by Grumski et al. [Grumski, J. T, and R. A. Bajura, *Performance of a Coriolis-Type Mass Flowmeter in the Measurement of Two-phase (air-liquid) Mixtures, Mass Flow Measurements ASME Winter Annual Meeting*, New Orleans, LA (1984)] and Hemp et al. [Hemp, J. and Sultan, G., *On the Theory and Performance of Coriolis Mass Flowmeter, Proceedings of the International Conference on Mass Flow Measurement, IBC technical Services*, London, 1989]. This theory is based on the main idea that, on the one hand, a density error, which in operation could be detected between a given true density and a measured apparent density, is proportional to the individual concentrations of the phases, and that the respective mass flow error may be strictly proportional to this density error, on the other hand. In other words, according to this theory, density and mass flow errors may directly coupled.

While, for decreasing the measurement errors associated with two, or more, phase media, a flow, respectively medium, conditioning preceding the actual flow rate measurement is proposed in WO-A 03/076880, both JP-A 10-281846, U.S. Pat. No. 6,311,136 and U.S. Pat. No. 6,505,519, for example, describe a correction of the flow rate measurement, especially the mass flow rate measurement, based on the oscillation measurement signals, which correction rests especially on the evaluation of deficits between a highly accurately measured, actual medium density and an apparent medium density determined by means of Coriolis mass flow measuring devices during operation. Especially in U.S. Pat. No. 6,505,519 or U.S. Pat. No. 6,311,136 there are also describe a correction method for mass flow errors. This does also base on said bubble theory essentially, and, thus, uses density errors, detected between a reference and an apparent density, to compensate mass flow errors caused by two-phase or multi-phase mixture.

In particular, pre-trained, in some cases even adaptive, classifiers of the oscillation measurement signals are proposed for this. The classifiers can, for example, be designed as a Kohonen map or neural network, and the correction is made either on the basis of some few parameters, especially the mass flow rate and the density measured during operation, as well as other features derived therefrom, or also using an interval of the oscillation measurement signals encompassing one or more oscillation periods. The use of such a classifier brings, for example, the advantage that, in comparison to conventional Coriolis mass flow/density meters, no, or only very slight, changes have to be made at the vibratory transducer, in terms of mechanical construction, the exciter arrangement or the operating circuit driving such, which are specially adapted for the particular application. However, a considerable disadvantage of such classifiers includes, among others, that, in comparison to conventional Coriolis mass flow measuring devices, considerable changes are required in the area of the measured value production, above all with regards to the analog-to-digital transducer being used and the microprocessors. As, namely, also described in U.S. Pat. No. 6,505,519, required for such a signal evaluation, for example, in the digitizing of the oscillation measurement signals, which can exhibit an oscillation frequency of about 80 Hz, is a sampling rate of about 55 kHz or more, in order to obtain a sufficient accuracy. Stated differently, the oscillation measurement signals have to be samples with a sampling ratio of far above 600:1. Beyond this, also the firmware stored and executed in the digital measurement circuit is correspondingly complex. A further disadvantage of such classifiers is that they must be trained and correspondingly validated for the conditions of measurement actually existing during operation of the vibratory transducer, be it regarding the particulars of the installation, the medium to be measured and its usually variable properties, or other factors influencing the accuracy of measurement. Because of the high complexity of the interplay of all these factors, the training and its validation can occur ultimately only on site and individually for each vibratory transducer, this in turn meaning a considerable effort for the startup of the vibratory transducer. Finally, it has been found, that such classifier algorithms, on the one hand because of the high complexity, on the other because of the fact that usually a corresponding physical-mathematical model with technically relevant or comprehensible parameters is not explicitly present, exhibit a very low transparency and are, consequently, often difficult to explain. Accompanying this situation, it is clear that considerable reservations can occur on the part of the customer, with such acceptance problems especially arising when the classifier, additionally, is self-adapting, for example a neural network.

As a further possibility for getting around the problem of inhomogeneous media, it is proposed, for instance, already in U.S. Pat. No. 4,524,610 to install the vibratory transducer such that the straight measuring tube extends essentially vertically, in order to prevent, as much as possible, a deposition of such disturbing, especially gaseous, inhomogeneities. Here, however, one is dealing with a very special solution which cannot always be implemented, without more, in the technology of industrial process measurement. On the one hand, in this case, it can happen, namely, that the pipeline, into which the vibratory transducer is to be inserted, might have to be adapted to the vibratory transducer, rather than the reverse, which can mean an increased expense for implementing the measurement location. On the other hand, as already mentioned, the measuring tubes might have a curved shape, in which case the problem cannot always be solved satisfactorily by an adapting of the installation orientation anyway. It has, moreover, been found in this case that the aforementioned corruptions of the measurement signal are not necessarily prevented with certainty by the use of a vertically installed, straight measuring tube anyway.

Furthermore, it has been found that despite of the compensation of mass flow errors based on reference and apparent density, particularly applied in consideration of said bubble effect, in any cases mass flow errors could not be eliminated perfectly. Especially it has been found that the "Bubble theory" can only explain negative density and mass flow errors, whereas it can not explain positive errors observed in several experiments. Indeed, compensation schemes based this theory usually tend to overestimate negative mass flow errors. Furthermore, according to the theory density and mass flow errors are directly coupled, which is not the case in practice. As discussed in U.S. patent application Ser. No. 60/682,017, there must be further effects that influence the measurement besides the "bubble theory", among which the moving resonator effect, also disclosed in this patent application might be an important one.

SUMMARY OF THE INVENTION

An object of the invention is, therefore, to provide a corresponding inline measuring device, especially a Coriolis mass flow measuring device, that is suited for measuring a physical, measured quantity, especially mass flow rate, density and/or viscosity, very accurately, even in the case of inhomogeneous, especially two, or more, phase media, and, indeed, especially desirably with a measurement error of less than 10% referenced to the actual value of the measured quantity. A further object is to provide corresponding methods for producing a corresponding measured value.

For achieving this object, the invention resides in a method for measuring at least one parameter of a two-, or multi-phase mixture flowing in a pipeline, by means of an inline measuring device including a measurement transducer of the vibration-type, and measuring device electronics electrically coupled with said measurement transducer, said mixture consisting of at least one first mixture phase and at least one second mixture phase.

Additionally, the invention resides in a method for determining a concentration of at least one phase of a mixture consisting of at least one first mixture phase and at least one second mixture phase, said mixture flowing in a pipeline, which is in communication with at least one measuring tube of an inline measuring device.

According to an aspect of the invention, the method comprises a step of conducting the mixture to be measured within at least one measuring tube of said measurement transducer, with the measuring tube being in communication with the pipeline.

According to a further aspect of the invention, the method comprises a step of causing at least one of said first and second mixture phases, currently within said measuring tube, to move relative to the measuring tube. The relative motions of said at least one of the first and second mixture phases stimulate said at last one measuring tube to vibrate within at least one of a plurality of instantaneous natural eigenmodes of said at least one measuring tube conducting said mixture.

According to another aspect of the invention, the method comprises a step of feeding an exciter arrangement with an excitation signal, said exciter arrangement being adapted to impart motion to said at least one measuring tube, said excitation signal including at least a first excitation signal component corresponding to a first one of a plurality of natural eigenmodes of said at least one measuring tube conducting said mixture.

According to further aspect of the invention, the method comprises a step of vibrating said at least one measuring tube within said first one of said plurality of natural eigenmodes and within a second one of said plurality of natural eigenmodes of said at least one measuring tube conducting said mixture. At least said second natural eigenmode is stimulated, at least partially, due to motions of at least one of said first and second mixture phase within said measuring tube relative to said measuring tube.

According to another aspect of the invention, the method comprises a step of sensing vibrations of the measuring tube conducting said mixture and generating at least one oscillation measurement signal representing oscillations of the vibrating measuring tube. The at least one oscillation measurement signal includes at least a first measurement signal component corresponding to said first natural eigenmode of said at least one measuring tube conducting said mixture. Further, the at least one oscillation measurement signal includes at least a second measurement signal component corresponding to said second one of said plurality of natural eigenmodes of said at least one measuring tube conducting said mixture.

According to a further aspect of the invention, the method comprises a step of using at least said first and second measurement signal components for generating at least one measured value representing said at least on parameter to be measured. The at least one parameter may the concentration of at least the one phase of the mixture and the at least one measured value may said concentration value representing the concentration to be measured.

According to a another aspect of the invention, the method comprises a step of using at least said first measurement signal components and said excitation signal for generating at least one measured value representing said at least on parameter to be measured.

In a first embodiment of the invention, the method the second natural eigenmode the measurement tube vibrating is essentially not stimulated by the exciter arrangement at least temporary.

In a second embodiment of the invention, the method the excitation signal is substantially devoid of any excitation signal components, which correspond to said second natural eigenmode stimulated due to said relative motion of said at least one first mixture phase and said at least one second mixture phase within the measuring tube, and/or which would excite said second natural eigenmode via said exciter arrangement.

In a third embodiment of the invention, the method further includes a step of flowing said mixture through said at least one measuring tube.

In a fourth embodiment of the invention, the method further comprises a step of vibrating said at least one measuring tube includes, at least temporary, a step of driving said measurement tube to oscillate within a driving mode for causing Coriolis forces within the mixture flowing through said measuring tube, said driving mode having at least one oscillation frequency that equals an instantaneous resonance frequency of said first natural eigenmode. The instantaneous resonance frequency of said first natural eigenmode may different from an instantaneous resonance frequency of said second eigenmode, In a fifth embodiment of the invention at least the second natural eigenmode has an instantaneous resonance frequency depending on said mixture currently within said measuring tube, and wherein the second measurement signal component of the oscillation measurement signal has an instantaneous signal frequency corresponding with said instantaneous resonance frequency of said second natural eigenmode, said method further comprising a step of using said instantaneous signal frequency of said second measurement signal component for generating said measured value. The first natural eigenmode of the measuring tube may have also an instantaneous resonance frequency depending on said mixture currently within said measuring tube. Further, at least the instantaneous resonance frequency of said second natural eigenmode may vary in time due to at least one of: relative motion of said first mixture and second mixture phases, changes in distribution of at least one of said first mixture and second mixture phases of the mixture within said measuring tube, and changes in a concentration of at least one of said first mixture and second mixture phases of the mixture. Furthermore, the instantaneous resonance frequency of said first natural eigenmode may different from an instantaneous resonance frequency of said second eigenmode. Said instantaneous signal frequency of said second measurement signal component may further used for selecting said second measurement signal component from said oscillation measurement signal.

In a sixth embodiment of the invention, the first excitation signal component causes said measuring tube to vibrate in said first natural eigenmode with an oscillation amplitude depending at least on an amplitude of said first excitation signal component fed to the exciter arrangement.

In a seventh embodiment of the invention, at least the oscillations of the measuring tube within said second natural eigenmode have an instantaneous oscillation amplitude depending on said mixture currently within said measuring tube, and wherein at least said second measurement signal component of the oscillation measurement signal has an instantaneous signal amplitude corresponding with said instantaneous oscillation amplitude of said oscillation of the measuring tube within said second natural eigenmode, said method further comprising a step of using said instantaneous signal amplitude of said second measurement signal component for generating said measured value.

In a eighth embodiment of the invention the oscillation amplitude of said oscillations of the measuring tube within the first natural eigenmode depends also on said mixture within said measuring tube.

In a ninth embodiment of the invention, the method further comprises a step of using said signal amplitude of the second measurement signal component for selecting said second measurement signal component from the oscillation measurement signal.

In a tenth embodiment of the invention a first oscillation factor, which represents a relation between said oscillation amplitude of said first natural eigenmode and said signal amplitude of said first excitation signal component causing said measuring tube to vibrate in said first natural eigenmode, may different from a second oscillation factor, which represents a relation between said oscillation amplitude of said second natural eigenmode and a signal amplitude of a second excitation signal component of the excitation signal having a signal frequency corresponding with the instantaneous resonance frequency of said second natural eigenmode. Further, the first oscillation factor may represent a ratio of said oscillation amplitude corresponding with the first natural eigenmode normalized to said signal amplitude of the first excitation signal component, the second oscillation factor may represent a ratio of said oscillation amplitude corresponding with the second natural eigenmode normalized to said signal amplitude of the second excitation signal component. Further, the method may comprise a step of adjusting said excitation signal such that said first oscillation factor is less than said second oscillation factor. Especially, the signal amplitude of said second excitation signal component of the excitation signal may essentially zero. Further, a signal-to-noise ratio of said second excitation signal component may less than two. In addition, the excitation signal, fed to said exciter arrangement, may include at least a third signal component corresponding to a third one of a plurality of natural eigenmodes of said at least one measuring tube conducting said mixture. This third excitation signal component may cause the measuring tube to vibrate in said third natural eigenmode with an oscillation amplitude depending at least on an amplitude of said third excitation signal component fed to the exciter arrangement.

In a eleventh embodiment of the invention, the method further comprises further comprising a step of causing said at least one first mixture phase and said at least one second mixture phase, currently within said measuring tube, to move relative to each other. The step of causing relative motion of said at least one first mixture phase and said at least one second mixture phase may further comprise a step of flowing said mixture through said at least one measuring tube. Furthermore, the relative motions of said at least one first mixture phase and said at least one second mixture phase may stimulate said at last one measuring tube to vibrate within said at least one of a plurality of instantaneous natural eigenmodes of said at least one measuring tube conducting said mixture.

In a twelfth embodiment of the invention, the method further comprises steps of selecting from said excitation signal said first excitation signal component, and using at least said first excitation signal component for generating said at least one measured value.

In a thirteenth embodiment of the invention, the method further comprises steps of determining from said excitation signal a current value representing a current of at least a portion of said excitation signal; and using said current value for generating said measured value.

In a fourteenth embodiment of the invention, the method further comprises steps of selecting from said excitation signal said first excitation signal component, and using at least said first excitation signal component for generating said at least one measured value.

In a fifteenth embodiment of the invention one of said at least one first mixture and second mixture phases of the mixture may gaseous and/or one of said at least one first mixture and second mixture phases of the mixture may liquid and/or one of said at least one first mixture and second mixture phases of the mixture is solid, i.e. granular.

In a sixteenth embodiment of the invention the mixture may selected from a group consisting of: powder, granulate, aerated oil, aerated water, aerosol, spray, slurry, pulp, paste.

In a seventeenth embodiment of the invention the physical parameter may selected from a group of parameters consisting of mass flow rate of said at least one first mixture phase of the mixture, mean density of at least one of said first mixture and second mixture phases of the mixture, mean viscosity of at least one of said first mixture and second mixture phases of the mixture, concentration of at least one of said first mixture and second mixture phases of the mixture, speed of sound of the mixture, and compressibility of the mixture.

In a eighteenth embodiment of the invention the steps of sensing vibrations of the measuring tube and generating at least one oscillation measurement signal representing oscillations of the vibrating measuring tube may comprise a step of using a sensor arrangement responsive to vibrations of said at least measuring tube, said being electrically coupled with a measuring device electronics of said inline measuring device.

In a nineteenth embodiment of the invention the step of causing at least one of said first and second mixture phases, currently within said measuring tube, to move relative to the measuring tube may comprise a step of flowing said mixture through said at least one measuring tube.

In a twentieth embodiment of the invention the method may further include a step of flowing said mixture through said at least one measuring tube, wherein the step of vibrating said at least one measuring tube includes, at least temporary, a step of driving said measurement tube to oscillate within a driving mode for causing Coriolis forces within the flowing mixture.

Additionally, the invention resides in an inline measuring device, for example a Coriolis mass-flow/density measuring device and/or a viscosity measuring device, for the measurement of at least one parameter, for example a mass flow rate, $\dot{m}$, a density, $\rho$, and/or a viscosity, $\eta$, of a two-phase or a multi-phase mixture, flowing in a pipeline, which inline measuring device comprises a vibratory-type transducer and a measuring device electronics electrically coupled with the vibratory-type transducer. The vibratory-type transducer includes at least one measuring tube inserted into the course of the pipeline. The at least one measuring tube serve for conducting the mixture to be measured, and the at least one measuring tube communicates with the connected pipeline. An exciter arrangement of the transducer may act on the measuring tube for causing the at least one measuring tube to vibrate, and a sensor arrangement for sensing vibrations of the at least one measuring tube and for delivering at least one oscillation measurement signal representing oscillations of the measuring tube.

The measuring device electronics is adapted to deliver, at least at times, an excitation current driving the exciter arrangement. Further the inline measuring device may adapted to execute at least one of the foregoing steps of the inventive method. Especially, the measuring device electronics may adapted to execute at least one of the steps of generating said at least one measured value, and generating said at least one concentration value.

According to a further aspect of the invention the inline measuring device may use for measuring at least one parameter, especially a mass flow rate, a density and/or a viscosity, of a two, or multi phase mixture flowing in a pipeline, especially a liquid-gas mixture.

The invention bases on the surprising discovery that, contrary to the "classical bubble theory", density and mass flow errors may not directly coupled. Moreover, investigations have shown that density error and mass flow error seems to be generally independent. A basic idea of the invention consists in tracking of at least one preselected eigenmode of the at least one measuring tube, which eigenmode is essentially not excited via exciter arrangement, but which eigenmode is dominantly excited by the moving mixture within the tube. Surprisingly, it could be found that certain parameters of such eigenmode oscillations, i.e. current resonance frequency, amplitude, experimental variance of resonance frequencies and of amplitudes, respectively etc., depend significantly from the characteristic of the mixture within the measuring tube. Further, it has been found that, based on such eigenmodes excited essentially by the mixture, the presence of two- or multi phase mixture inside the tube could be detected. In addition, appropriate compensation algorithm, which may correct measurement errors related to two- or multi phase mixture based on certain eigenmode parameters, could be designed. Moreover, based on an analytical model for the oscillating system, which is formed by the vibrating measuring tube and the mixture volume within, certain measurement errors, i.e. density error and mass flow error, may corrected during operation of the inline measuring device, and, thus, measurement accuracy of such inline meters could be improved.

As a result of modeling both, the vibrating measuring tube and the mixture volume within the vibrating measuring tube the inventive model is also able to predict positive errors, which the classical "bubble theory" not does. These effects are in accordance with experimental results. In fact, the model may provide convenient explanations of mass flow and density errors in various situations, especially liquid-gas-mixtures.

Another advantage of the invention is that the dynamical characteristics of the mixture volume within the vibrating measuring tube is taken in account for compensating errors caused by two-phase or multi-phase mixture, especially in case of liquid with entrained gas. Therefore, the correction values to be determined are well reproducible over a large range of application and, also, the forming rules for determining the correction values during measurement operation can be formulated relatively simply. Moreover, these forming rules can be calculated initially with a relatively small effort. A further advantage of the invention is, additionally, to be seen in the fact that, in the case of the inline measuring device of the invention, as compared to a conventional type, especially such as described in WO-A 03/095950, WO-A 03/095949 or U.S. Pat. No. 4,524,610, only in the case of the usually digital, measured value production do slight changes have to be made, these being essentially limited to the firmware, while, both in the case of the vibratory transducer and in the production and preprocessing of the oscillation measurement signals, no, or only slight, changes are required. Thus, for example, even in the case of two, or more, media, the oscillation measurement signals can be sampled, as before, with a usual sampling ratio of far under 100:1, especially of about 10:1.

BRIEF DESCRIPTION OF THE DRAWINGS

The invention and further advantageous embodiments will now be explained in detail on the basis of examples of embodiments presented in the figures of the drawing. Equal parts are provided in all figures with equal reference characters; when required in the interest of clarity, already mentioned reference characters are omitted in subsequent figures.

FIG. 3 shows, sectioned in a side view, the vibratory transducer of FIG. 2;

FIG. 4 shows the vibratory transducer FIG. 2 in a first cross section;

FIG. 5 shows the vibratory transducer of FIG. 2 in a second cross section;

DETAILED DESCRIPTION OF EXEMPLARY EMBODIMENTS

Figure 1:
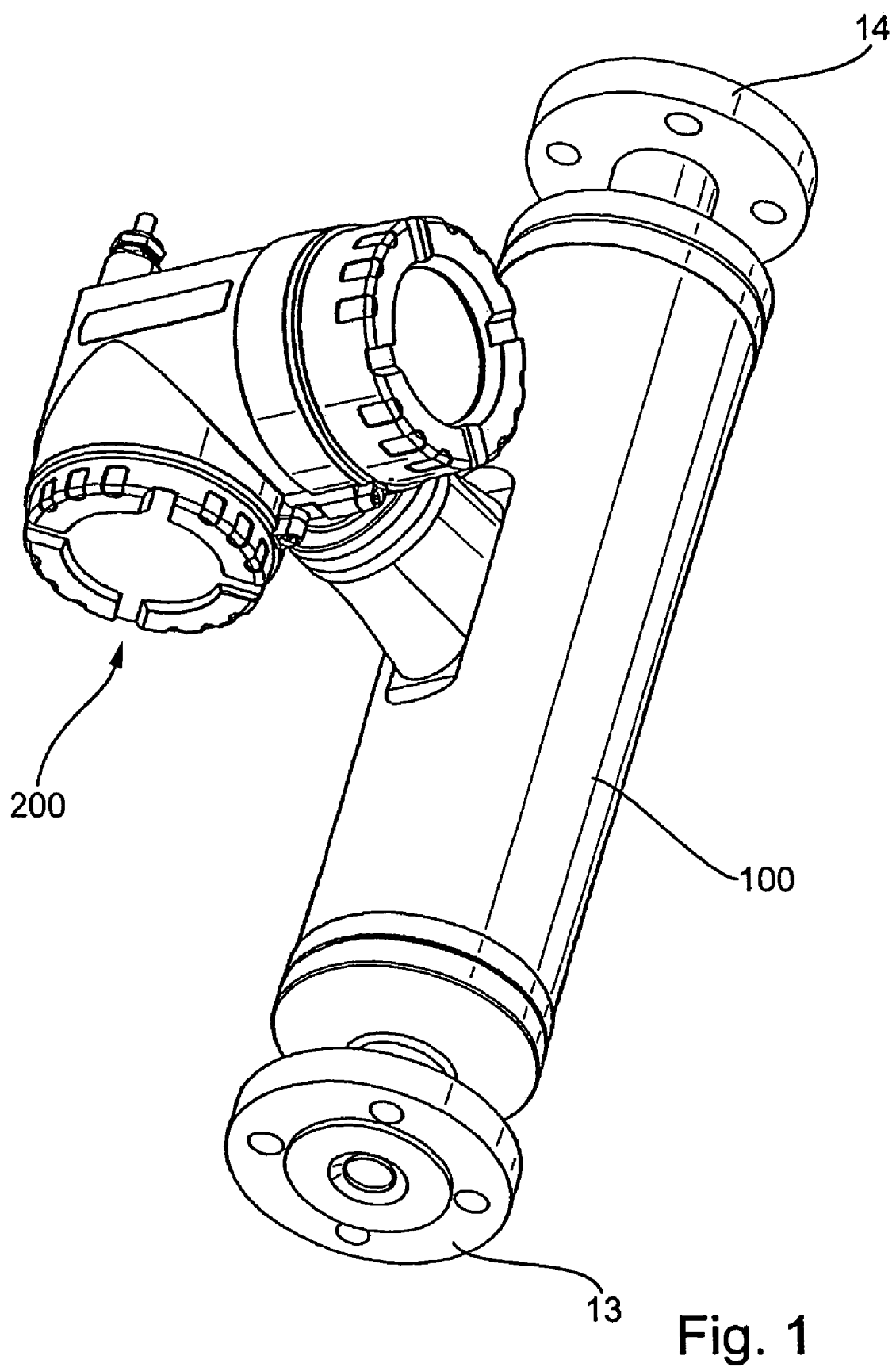
FIG. 1 shows an inline measuring device which can be inserted into a pipeline for measuring a mass flow rate of a fluid guided in the pipeline.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows, respectively, an inline measuring device 1 suited for determining a physical, measured quantity, e.g. a mass flow rate, $\dot{m}$, a density, $\rho$, and/or a viscosity, $\eta$, of a medium flowing in a pipeline (not shown) and for imaging this measured quantity in an instantaneously representing, measured value $X_x$, especially a mass flow value $X_m$, a density value $X_\rho$, and a viscosity value $X_\eta$, respectively. The medium in this instance can be practically any flowable substance. Particularly, the medium is developed as a two-phase or a multi-phase mixture, which consists of at least one first mixture phase and at least one second mixture phase. For example, one or each of said at least one first mixture and second mixture phases of the mixture may gaseous, liquid or solid, i.e. granular. Therefore, media may be a liquid-gas mixture, a vapor, a powder, granulate, aerated oil, aerated water, aerosol, spray, slurry, pulp, paste or the like. At least for this case, the inline measuring device 1 may also suited for determining a concentration of at least one phase of a mixture consisting of at least one first mixture phase and at least one second mixture phase. Furthermore, the physical parameter may selected from a group of parameters consisting of mass flow rate of said at least one first mixture phase of the mixture, mean density of at least one of said first mixture and second mixture phases of the mixture, mean viscosity of at least one of said first mixture and second mixture phases of the mixture, concentration of at least one of said first mixture and second mixture phases of the mixture, speed of sound of the mixture, and compressibility of the mixture.

Figure 2:
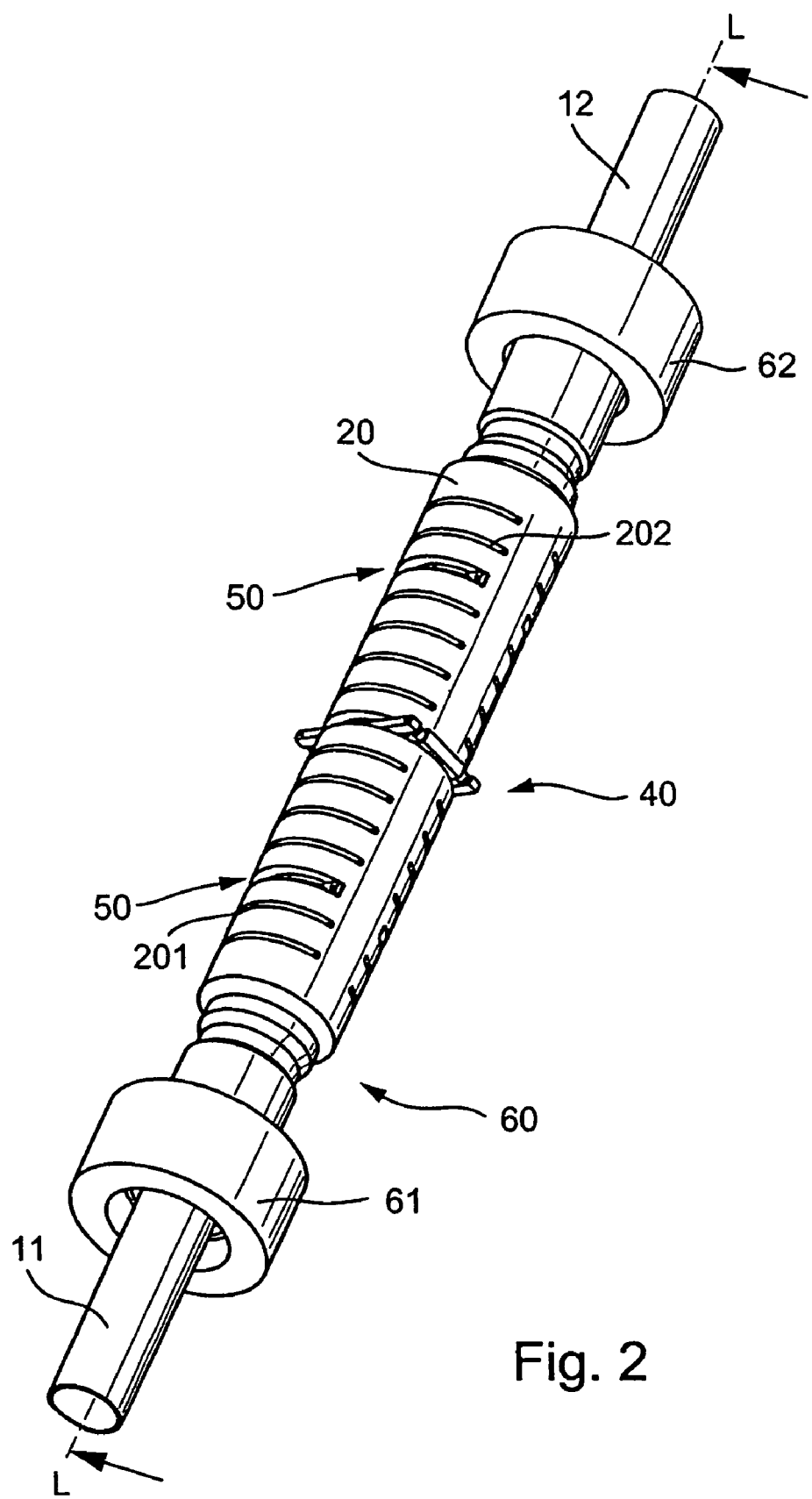
FIG. 2 shows, in a perspective, side view, an example of an embodiment for a measurement transducer of the vibratory-type suited for the measuring device of FIG. 1.
Figure 6:
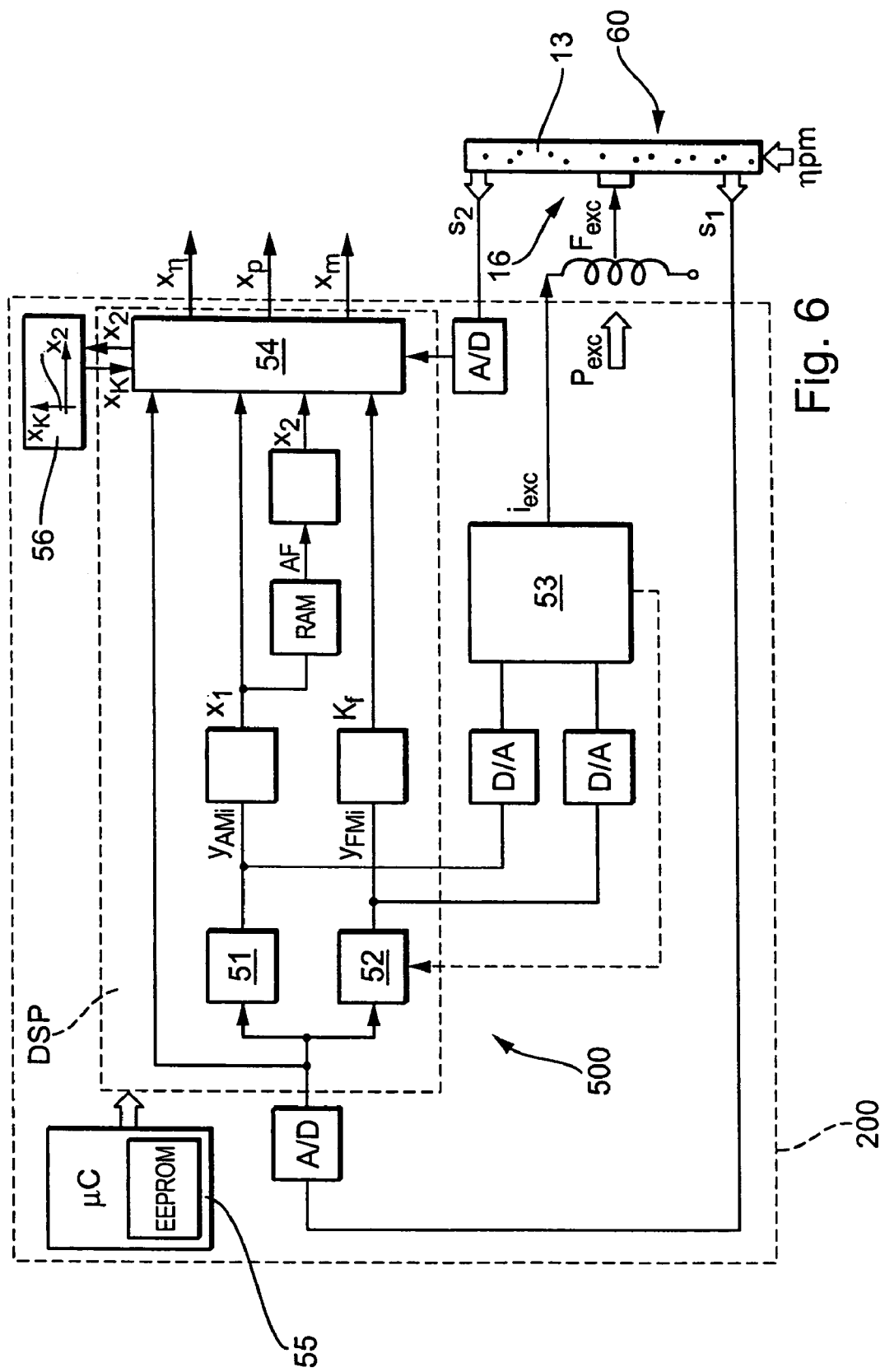
FIG. 6 shows schematically in the form of a block diagram a embodiment of a measuring device electronics suited for the inline measuring device of FIG. 1.
Figure 7:
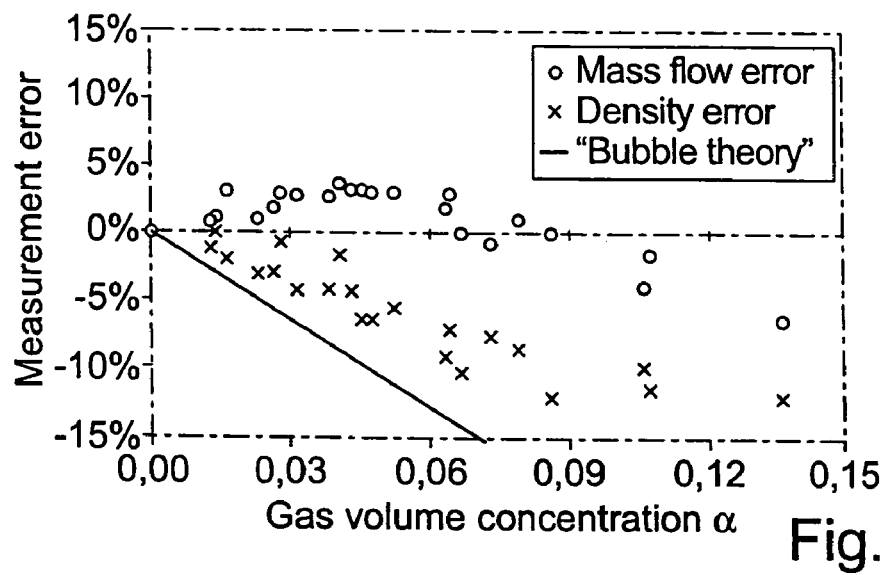
FIG. 7 shows measurement errors on gas concentration.

The inline measuring device 1, for example provided in the form of a Coriolis mass flow, density and/or viscosity meter, includes therefor a vibratory transducer 10 flowed-through by the medium to be measured, an example of an embodiment and developments being shown in FIGS. 2 to 6, together with a measuring device electronics 500, as illustrated schematically in FIGS. 2 and 7, electrically coupled with the vibratory-type transducer. Further, the measuring device electronics 500 may, additionally, so designed that it can, during operation of the inline measuring device 1, exchange measurement and/or operational data with a measured value processing unit superordinated, i.e. located at a higher level, with respect thereto, for example a programmable logic controller (PLC), a personal computer and/or a workstation, via a data transmission system, for example a field bus system. Furthermore, the measuring device electronics is designed such that it can be supplied from an external energy supply, for example also over the aforementioned field bus system. For the case in which the vibratory measuring device is provided for coupling to a field bus or some other communication system, the, especially programmable, measuring device electronics 500 is equipped with a corresponding communications interface for a communication of data, e.g. for the transmission of the measurement data to the already mentioned, programmable logic controller or to a superordinated process control system. For accommodation of the measuring device electronics 500, an electronics housing 200 is additionally provided, especially one mounted externally directly onto the vibratory transducer 10, but even one possibly set apart from such.

As already mentioned, the inline measuring device includes a vibratory transducer, which is flowed-through by the medium to be measured, and which serves for producing, in a through-flowing medium, mechanical reaction forces, especially Coriolis forces, dependent on the mass flow rate, inertial forces dependent on the density of the medium and/or frictional forces dependent on the viscosity of the medium, forces which react measurably, i.e. capable of being detected by sensor, on the vibratory transducer. Derived from these reaction forces characterizing the medium, e.g. the mass flow rate, the density and/or the viscosity of the medium can be measured in manner known to those skilled in the art. In FIGS. 3 and 4, an example of an embodiment of an electrophysical transducer arrangement, serving as a vibratory transducer 10, is schematically illustrated. The mechanical construction and manner of functioning of such a transducer arrangement is known per se to those skilled in the art and is also described in detail in U.S. Pat. No. 6,691,583, WO-A 03/095949 or WO-A 03/095950.

For conducting medium to be measured and for producing said reaction forces, the vibratory transducer includes at least one measuring tube 10 of predeterminable measuring tube diameter. The at least one measuring tube 10 may be a curved tube or, as shown in FIGS. 3 and 4, an essentially straight tube. Anyway, during operation the tube 10 is caused to vibrate, at least at times, and is repeatedly elastically deformed thereby. Elastic deformation of the measuring tube lumen means here, that a spatial form and/or a spatial position of the measuring tube lumen is changed within an elastic range of the measuring tube 10 in predeterminable manner cyclically, especially periodically; compare, in this connection, also U.S. Pat. No. 4,801,897, U.S. Pat. No. 5,648,616, U.S. Pat. No. 5,796,011, U.S. Pat. No. 6,006,609, U.S. Pat. No. 6,691,583, WO-A 03/095949 and/or WO-A 03/095950. It should be mentioned here that, instead of the vibratory transducer shown in the example of an embodiment having a single, straight measuring tube, the vibratory transducer serving for implementation of the invention can, as well, be selected from a multiplicity of vibratory transducers known in the state of the art. In particular, suited, for example, are vibratory transducers having two parallel, straight measuring tubes flowed-through by the medium to be measured, such as are described in detail also in U.S. Pat. No. 5,602,345.

As shown in FIG. 1, the vibratory transducer 1 additionally has a vibratory transducer housing 100 surrounding the measuring tube 10, as well as surrounding possible other components of the vibratory transducer (see also further below). Housing 100 acts to protect tube 10 and other components from damaging environmental influences and/or to damp possible outwardly-directed sound emissions of the vibratory transducer. Beyond this, the vibratory transducer housing 100 also serves as a mounting platform for an electronics housing 200 housing the measuring device electronics 500. To this end, the vibratory transducer housing 100 is provided with a neck-like transition piece, on which the electronics housing 200 is appropriately fixed; compare FIG. 1. Instead of the tube-shaped transducer housing 100 shown here extending coaxially with the measuring tube, other suitable housing forms can, of course, be used, such as e.g. box-shaped structures.

The measuring tube 10 is oscillatably suspended in the preferably rigid, especially bending- and twisting-stiff, transducer housing 100. For permitting the medium to flow through, the measuring tube is inserted into the course of the pipeline and connected to the pipeline via an inlet tube piece 11 opening into the inlet end 11# and an outlet tube piece 12 opening into the outlet end 12#, such that the measuring tube communicates in the usual manner at inlet and outlet ends with the pipeline introducing, respectively extracting, the medium to be measured. Measuring tube 10, inlet tube piece 11 and outlet tube piece 12 are aligned with one another and with the above-mentioned measuring tube longitudinal axis L as exactly as possible and are, advantageously, provided as one piece, so that e.g. a single, tubular stock can serve for their manufacture; in case required, measuring tube 10 and tube pieces 11, 12 can, however, also be manufactured by means of separate, subsequently joined, e.g. welded, stock. For manufacture of the measuring tube 10, as well as the inlet and outlet, tubular pieces 11, 12, practically every usual material for such vibratory transducers can be used, such as e.g. alloys of iron, titanium, zirconium and/or tantalum, synthetic materials, or ceramics. For the case where the vibratory transducer is to be detachable assembled with the pipeline, first and second flanges 13, 14 are preferably formed on the inlet tube piece 11 and the outlet tube piece 12, respectively; if required, the inlet and outlet tube pieces can, however, also be connected directly to the pipeline, e.g. by means of welding or brazing. Additionally, as shown schematically in FIG. 1, the transducer housing 100 is provided, fixed to the inlet and outlet tube pieces 11, 12, for accommodating the measuring tube 10; compare, in this connection, FIGS. 1 and 2.

At least for measuring the mass flow rate $\dot{m}$, the measuring tube 10 is excited in a first mode of oscillation, so called "driving mode" or "useful mode", developed as a lateral oscillation mode. In that driving mode the measuring tube 10 executes, at least in part, oscillations, i.e. bending oscillations, laterally to an imaginary measuring tube longitudinal axis L. According to an aspect of the invention, the at least one measuring tube is vibrated within a first one of a plurality of natural eigenmodes. Especially, the measuring tube 10 executes oscillations in a first eigenmode such that it oscillates laterally outwards at a natural bending eigenfrequency, according to a natural, first form of eigenoscillation. Further, the instantaneous resonance frequency of said first natural eigenmode is usually different from an instantaneous resonance frequency of any higher order eigenmodes of the measuring tube.

For the case where the medium is flowing in the connected pipeline and, consequently, the mass flow rate $\dot{m}$ is different from zero, the measuring tube 10, oscillating in the first mode of oscillation, induces Coriolis forces in the medium as it flows through. These, in turn, interact with the measuring tube 10 and result, in the manner known to those skilled in the art, in an additional, sensor-detectable deformation of the measuring tube 10 coplanarly superimposed on the oscillation under the driving mode. These additional deformation correspond essentially to a form of a higher order natural, second eigenmode of the tube, the so-called "Coriolis mode". The instantaneous shape of the deformation of the measuring tube 10 is, in such case, especially as regards its amplitudes, also dependent on the instantaneous mass flow rate $\dot{m}$. Here, it should be noted that the deflection caused by the Coriolis forces having the same frequency as the deflection according to the driving mode, however, the—herein symmetric—driving mode and the—here anti-symmetric—Coriolis mode are superimposed 90° out of phase. Anyway, the at least one measuring tube conducting said mixture vibrates also in a second one of said plurality of its natural eigenmodes.

As usual in the case of such vibratory transducers, anti-symmetric forms of bending oscillation of two, or four, antinodes can e.g. serve as the second form of eigenoscillation. Since natural eigenfrequencies of such modes of lateral oscillation of measuring tubes are known to depend, in special measure, also on the density $\rho$ of the medium, also the density $\rho$ can be measured, without more, by means of the inline measuring device, in addition to the mass flow rate m. In addition to the lateral oscillations, the at least one measuring 10 is also driven, at least at times, in a torsional mode of oscillation, for producing viscosity-dependent, shear forces in the flowing medium. In this torsional mode of oscillation, the measuring tube is excited to torsional oscillations about an axis of torsional oscillation extending essentially parallel to, or coinciding with, the longitudinal axis L of the measuring tube. Essentially, this excitement is such that the measuring tube 10 is twisted about its longitudinal axis L in a form of natural, torsional oscillation; compare, in this connection, e.g. also U.S. Pat. No. 4,524, 610, U.S. Pat. No. 5,253,533, U.S. Pat. No. 6,006,609 or EP-A 1 158 289. The exciting of said torsional oscillations can, in such case, occur either in alternation with the first useful mode of oscillation and separated therefrom, in a second useful mode of oscillation, or, at least in the case of mutually distinguishable oscillation frequencies, also simultaneously with the lateral oscillations in the first useful mode of oscillation. Stated differently, the vibratory transducer works, at least at times, in a dual-mode of operation, in which the at least one measuring tube 10 is caused to vibrate alternatively in at least two oscillation modes essentially independent of one another, namely in the lateral oscillation mode and in the torsional oscillation mode.

According to one embodiment of the invention, for producing the mass flow rate-dependent Coriolis forces in the flowing medium, the measuring tube 10 is excited, at least at times, with a lateral oscillation frequency, which corresponds as exactly as possible to a lowest natural bending eigenfrequency of the measuring tube 10, so that, thus, the laterally oscillating measuring tube 10, without fluid flowing through it, is essentially symmetrically bowed outwards with respect to a middle axis perpendicular to the longitudinal axis L of the measuring tube and, in doing so, exhibits a single oscillation antinode. This lowest bending eigenfrequency can be, for example, in the case of a stainless steel tube serving as the measuring tube 10, of nominal diameter 20 mm, wall thickness about 1.2 mm and length about 350 mm, with the usual appendages, about 850 Hz to 900 Hz.

In a further embodiment of the invention, the measuring tube 10 may excited, especially simultaneously to the lateral oscillations in the first useful mode, with a torsional oscillation frequency $f_{excT}$, which corresponds as exactly as possible to a natural torsional eigenfrequency of the measuring tube. A lowest torsional eigenfrequency can, for example, lie in the case of a straight measuring tube about in the range of twice the lowest bending eigenfrequency.

As already mentioned, the oscillations of the measuring tube 11 are damped, on the one hand, by transfer of oscillation energy, especially to the medium. On the other hand, however, oscillation energy can also be withdrawn from the vibrating measuring tube to a considerable degree by the excitation of components mechanically coupled therewith into oscillations, components such as e.g. the transducer housing 100 or the connected pipeline. For the purpose of suppressing or preventing a possible loss of oscillation energy to the environment, a counteroscillator 20 is, therefore, provided in the vibratory transducer fixed to the inlet and outlet ends of the measuring tube 10. The counteroscillator 20 is, as shown schematically in FIG. 2, preferably embodied as one piece. If required, the counteroscillator 20 can be composed of multiple parts, as shown e.g. also in U.S. Pat. No. 5,969,265, EP-A 317 340 or WO-A 00/14485, or it can be implemented by means of two separate counteroscillator portions fixed to the inlet and outlet ends of the measuring tube 10. The counteroscillator 20 serves, among other things, to balance the vibratory transducer dynamically for at least one, predetermined density value of the medium, for example a density value most frequently to be expected, or also a critical density value, to such an extent that transverse forces and/or bending moments possibly produced in the vibrating measuring tube 10 are largely compensated; compare, in this connection, also U.S. Pat. No. 6,691,583. Moreover, the counteroscillator 20 serves for the above-described case, where the measuring tube 10 is also excited during operation to torsional oscillations, additionally to produce counter torsional moments largely compensating such torsional moments as are produced by the single measuring tube 10 preferably twisting about its longitudinal axis L, thus holding the environment of the vibratory transducer, especially, however, the connected pipeline, largely free of dynamic torsional moments. The counteroscillator 20 can, as shown schematically in FIGS. 2 and 3, be embodied in tube shape and can be connected, for example, to the inlet end 11# and the outlet end 12# of the measuring tube 10 in such a manner that it is, as shown in FIG. 3, arranged essentially coaxially with the measuring tube 10. The counteroscillator 20 can be made of practically any of the materials also used for the measuring tube 10, thus, for example, stainless steel, titanium alloys, etc.

The counteroscillator 20, which is, especially in comparison to the measuring tube 10, somewhat less torsionally and/or bendingly elastic, is likewise caused to oscillate during operation and, indeed, with essentially the same frequency as the measuring tube 10, but out of phase therewith, especially with opposite phase. To this end, the counteroscillator 20 is caused to oscillate with at least one of its torsional eigenfrequencies tuned as accurately as possible to those torsional oscillation frequencies, with which the measuring tube is predominantly caused to oscillate during operation. Moreover, the counteroscillator 20 is adjusted also in at least one of its bending eigenfrequencies to at least one bending oscillation frequency with which the measuring tube 10, especially in the first mode, is caused to oscillate, and the counteroscillator 20 is excited during operation of the vibratory transducer also to lateral oscillations, especially bending oscillations, which are developed essentially coplanarly with lateral oscillations of the measuring tube 10, especially the bending oscillations of the useful mode.

In an embodiment of the invention shown schematically in FIG. 3, the counteroscillator 20 has, for this purpose, grooves 201, 202, which make possible an exact adjustment of its torsional eigenfrequencies, especially a sinking of the torsional eigenfrequencies through a sinking of a torsional stiffness of the counteroscillator 20. Although the grooves 201, 202 are shown in FIG. 2 or FIG. 3 essentially uniformly distributed in the direction of the longitudinal axis L, they can, if required, also be arranged, without more, distributed non-uniformly in the direction of the longitudinal axis L. Moreover, the mass distribution of the counteroscillator can, as likewise shown schematically in FIG. 3, also be corrected by means of corresponding mass balancing bodies 101, 102 fixed to the measuring tube 10. These mass balancing bodies 101, 102 can be e.g. metal rings pushed onto the measuring tube 10, or small metal plates fixed thereto.

For producing mechanical oscillations of the measuring tube 10, the vibratory transducer additionally includes an exciter arrangement 40, especially an electrodynamic one, coupled to the measuring tube and adapted to impart motion to said at least one measuring tube. The exciter arrangement 40 serves for converting an electrical exciter power $P_{exc}$ fed from the measuring device electronics, e.g. having a regulated excitation current $i_{exc}$ and/or a regulated voltage, into an e.g. pulse-shaped, or harmonic, exciter moment $M_{exc}$ and/or an exciter force $F_{exc}$ acting on, and elastically deforming, the measuring tube 10. For achieving a highest possible efficiency and a highest possible signal/noise ratio, the exciter power $P_{exc}$ is tuned as exactly as possible such that predominantly the oscillations of the measuring tube 10 in the useful mode are maintained, and, indeed, as accurately as possible to an instantaneous eigenfrequency of the measuring tube containing the medium flowing therethrough. The exciter force $F_{exc}$, as well as also the exciter moment $M_{exc}$, can, in this case, as is shown schematically in FIG. 4, each be developed bidirectionally or, however, also unidirectionally, and can be adjusted in the manner known to those skilled in the art, e.g. by means of a current and/or voltage regulating circuit as regards their amplitude and e.g. by means of a phase locked loop as regards their frequency. The exciter arrangement 40 can include, as usual in the case of such vibratory measurement-pickups, for instance a plunger coil arrangement having a cylindrical exciter coil attached to the counteroscillator 20 or to the inside of the transducer housing 100. In operation, the exciter coil has a corresponding excitation current $i_{exc}$ flowing through it. Additionally included in the exciter arrangement 40 is a permanently magnetic armature extending at least partially into the exciter coil and fixed to the measuring tube 10. Furthermore, the exciter arrangement 40 can also be realized by means of a plurality of plunger coils, or also by means of electromagnets, such as e.g. shown in U.S. Pat. No. 4,524,610 or WO-A 03/095950.

For detecting the oscillations of the measuring tube 10, the vibratory transducer additionally includes a sensor arrangement 50, which produces, as a representation of vibrations of the measuring tube 10 at least one oscillation measurement signal. Therefore, sensor arrangement includes at least a first oscillation sensor 51, which reacts to vibrations of the measuring tube and which delivers, a first oscillation measurement signal $s_1$. The oscillation sensor 51 can be formed by means of a permanently magnetic armature, which is fixed to the measuring tube 10 and interacts with a sensor coil mounted on the counteroscillator 20 or the transducer housing. To serve as the oscillation sensor 51, especially such sensors are suited, which detect a velocity of the deflections of the measuring tube 10, based on the electrodynamic principle. However, also acceleration measuring, electrodynamic or even travel-distance measuring, resistive or optical sensors can be used. Of course, other sensors known to those skilled in the art as suitable for detection of such vibrations can be used. The sensor arrangement 60 includes, additionally, a second oscillation sensor 52, especially one identical to the first oscillation sensor 51. The second sensor 52 provides a second oscillation measurement signal $s_2$ likewise representing vibrations of the measuring tube 10. The two oscillation sensors 51, 52 are in this embodiment so arranged in the vibratory transducer 10, separated from one another along the length of the measuring tube 10, especially at equal distances from the halfway point of the measuring tube 10, that the sensor arrangement 50 locally registers both inlet-end and outlet-end vibrations of the measuring tube 10 and converts them into the corresponding oscillation measurement signals $s_1$, $s_2$. The two oscillation measurement signals $s_1$, $s_2$, which usually each exhibit a signal frequency corresponding to an instantaneous oscillation frequency of the measuring tube 10, are, as shown in FIG. 2, fed to the measuring device electronics 500, where they are preprocessed, especially digitized, and then suitably evaluated by means of corresponding components. In case of the measuring tube oscillates within at least a first one of its natural eigenmodes, at least a first measurement signal component of measurement signal corresponds to one of the natural eigenmodes of the measuring tube conducting said mixture. Consequently, in case of the measuring tube oscillates also within at least a second one of its natural eigenmodes, the at least one oscillation measurement signal may include at least a second measurement signal component corresponding to said second one of said plurality of natural eigenmodes of said at least one measuring tube conducting said mixture.

According to an embodiment of the invention, the exciter arrangement 40 is, as, in fact, shown in FIGS. 2 and 3, so constructed and arranged in the vibratory transducer, that it acts, during operation, simultaneously, especially differentially, on the measuring tube 10 and on the counteroscillator 20. In the case of this further development of the invention, the exciter arrangement 40 is, as, in fact, shown in FIG. 2, advantageously so constructed and so arranged in the vibratory transducer, that it acts, during operation, simultaneously, especially differentially, on the measuring tube 10 and on the counteroscillator 20. In the example of an embodiment shown in FIG. 4, the exciter arrangement 40 has, for such purpose, at least one first exciter coil 41a, through which the excitation current, or an excitation current component, flows at least at times during operation. The exciter coil 41a is fixed to a lever 41c connected to the measuring tube 10 and acts differentially on the measuring tube 10 and the counteroscillator 20 via this lever and an armature 41b fixed externally to the counteroscillator 20. This arrangement has, among others, the advantage that, on the one hand, the counteroscillator 20, and thus also the transducer housing 20, is kept small in cross section and, in spite of this, the exciter coil 41a is easily accessible, especially also during assembly. Moreover, a further advantage of this embodiment of the exciter arrangement 40 is that possible used coil cups 41d, which especially at nominal diameters of over 80 mm, have weights which can no longer be ignored, are fixable on the counteroscillator 20 and, consequently, have practically no influence on the eigenfrequencies of the measuring tube 10. It is to be noted here, however, that, in case required, the exciter coil 41a can also be held by the counteroscillator 20 and the armature 41b, then, by the measuring tube 10.

In corresponding manner, the oscillation sensors 51, 52 can be so designed and arranged in the vibratory transducer that the vibrations of the measuring tube 10 and the counteroscillator 20 are registered differentially by them. In the example of an embodiment shown in FIG. 5, the sensor arrangement 50 includes a sensor coil 51a fixed to the measuring tube 10, here outside of all principal axes of inertia of the sensor arrangement 50. The sensor coil 51a is arranged as close as possible to an armature 51b fixed to the counteroscillator 20 and magnetically so coupled with such, that a changing measurement voltage is induced in the sensor coil, influenced by rotary and/or lateral, relative motions between measuring tube 10 and counteroscillator 20 in changing their relative position and/or their relative separation. On the basis of such an arrangement of the sensor coil 51a, both the above-mentioned torsional oscillations and the excited bending oscillations can, advantageously, be registered simultaneously. If necessary, the sensor coil 51a therefor can, however, also be fixed to the counteroscillator 20 and the armature 51b coupled therewith can, correspondingly, then be fixed to the measuring tube 10.

In another embodiment of the invention, measuring tube 10, counteroscillator 20 and the sensor and exciter arrangements 40, 50 secured thereto are so matched to one another with respect to their mass distribution, that the resulting inner part of the vibratory transducer, suspended by means of the inlet and outlet tube pieces 11, 12, has a center of mass MS lying at least inside of the measuring tube 10, and preferably as close as possible to the longitudinal axis L of the measuring tube. Additionally, the inner part is advantageously so constructed that it has a first principal axis of inertia $T_1$ aligned with the inlet tube piece 11 and the outlet tube piece 12 and lying at least sectionally within the measuring tube 10. Due to the displacement of the center of mass MS of the inner part, especially, however, also due to the above-described position of the first principal axis of inertia $T_1$, the two oscillation forms assumed in operation by the measuring tube 10 and largely compensated by the counteroscillator 20, namely the torsional oscillations and the bending oscillations of the measuring tube 10, are highly mechanically decoupled from one another; compare, in this connection, also WO-A 03/095950. In this way, the two forms of oscillation, thus lateral oscillations and/or torsional oscillations, are advantageously, without more, excited separately from one another. Both the displacement of the center of mass MS and also the first principal axis of inertia $T_1$ toward the longitudinal axis of the measuring tube can, for example, be considerably simplified by having the inner part, thus measuring tube 10, counteroscillator 20 and the sensor and exciter arrangements 50, 40 secured thereto, so constructed and arranged with respect to one another, that a mass distribution of the inner part along the length of the measuring tube longitudinal axis L is essentially symmetrical, at least, however, invariant relative to an imaginary rotation about the longitudinal axis L of the measuring tube by 180° (c2-symmetry). Additionally, the counteroscillator 20—here tubularly, especially also largely axially symmetrically, embodied—is arranged essentially coaxially with the measuring tube 10, whereby the reaching of a symmetrical distribution of mass in the inner part is significantly simplified, and, consequently, also the center of mass MS is displaced in simple manner close to the longitudinal axis L of the measuring tube. Moreover, the sensor and exciter arrangements 50, 40 in the example of an embodiment presented here are so constructed and arranged relative to one another on the measuring tube 10 and, where appropriate, on the counteroscillator 20, that a mass moment of inertia produced by them is developed as concentrically as possible to the longitudinal axis L of the measuring tube or at least is kept as small as possible. This can e.g. be achieved by having a common center of mass of sensor and exciter arrangements 50, 40 lie as close as possible to the longitudinal axis L of the measuring tube and/or by keeping the total mass of sensor and exciter arrangements 50, 40 as small as possible.

In a further embodiment of the invention, the exciter arrangement 40 is, for the purpose of the separated exciting of torsional and/or bending oscillations of the measuring tube 10, so constructed and so fixed to the measuring tube 10 and to the counteroscillator 20, that a force producing the bending oscillations acts on the measuring tube 10 in the direction of an imaginary line of force extending outside of a second principal axis of inertia $T_2$ perpendicular to the first principal axis of inertia $T_1$, or intersecting the second principal axis of inertia in, at most, one point. Preferably, the inner part is so embodied that the second principal axis of inertia $T_2$ is essentially the above-mentioned middle axis. In the example of an embodiment shown in FIG. 4, the exciter arrangement 40 has, for this purpose, at least one first exciter coil 41a, through which the excitation current or an excitation current component flows at least at times during operation. Exciter coil 41a is fixed to a lever 41c connected with the measuring tube 10 and via this lever and an armature 41b fixed externally to the counteroscillator 20, acts differentially on the measuring tube 10 and the counteroscillator 20. This arrangement has, among other things, also the advantage that, on the one hand, the counteroscillator 20 and, consequently, also the transducer housing 100 are kept small in cross section and, in spite of this, the exciter coil 41a is easily accessible, especially also during assembly. Moreover, a further advantage of this embodiment of the exciter arrangement 40 is that possibly used coil cups 41d, which especially at nominal diameters of over 80 mm have weights that no longer can be neglected, can likewise be fixed to the counteroscillator 20 and, consequently, have practically no effect on the resonance frequencies of the measuring tube. It should be noted here that, when required, the exciter coil 41a can also be mounted to the counteroscillator 20 and then the armature 41b is held by the measuring tube 10.

According to a further embodiment of the invention, the exciter arrangement 40 has at least one, second exciter coil 42a arranged along a diameter of the measuring tube 10 and coupled with the measuring tube 10 and the counteroscillator 20 in the same way as the exciter coil 41a. According to another, preferred embodiment of the invention, the exciter arrangement has two further exciter coils 43a, 44a, thus a total of four, at least arranged symmetrically with respect to the second principal axis of inertia $T_2$. All coils are mounted in the vibratory transducer in the above-described manner. The force acting on the measuring tube 10 outside of the second principal axis of inertia $T_2$ can be produced by means of such two, or four, coil arrangements in simple manner e.g. by having one of the exciter coils, e.g. the exciter coil 41a, exhibit another inductance than the respective others, or by causing to flow through one of the exciter coils, e.g. the exciter coil 41a, during operation, an excitation current component that is different from a respective excitation current component of the respectively other exciter coils.

According to another embodiment of the invention, the sensor arrangement 50 includes, as shown schematically in FIG. 5, a sensor coil 51a arranged outside of the second principal axis of inertia $T_2$ and fixed to measuring tube 10. The sensor coil 51a is arranged as near as possible to an armature 51b fixed to the counteroscillator 20 and is magnetically coupled therewith such that a changing measurement voltage is induced in the sensor coil, influenced by rotary and/or lateral relative motions between measuring tube 10 and counteroscillator 20 as they change their relative positions and/or their relative separations. Due to the arrangement of the sensor coil 51a according to the invention, both the above-described torsional oscillations and the bending oscillations, excited where appropriate, can be registered in advantageous manner simultaneously. If required, the sensor coil 51a therefor can, instead, be fixed to the counteroscillator 20 and, in corresponding manner, the armature 51b coupled therewith can be fixed to the measuring tube 10.

It is noted here, additionally, that the exciter arrangement 40 and the sensor arrangement 50 can also have, in the manner known to those skilled in the art, essentially the same mechanical structure; consequently, the above-described embodiments of the mechanical structure of the exciter arrangement 40 can essentially also be transferred to the mechanical structure of the sensor arrangement 50, and vice versa.

For vibrating the measuring tube 10, the exciter arrangement 40 is fed with an excitation signal. Advantageously, the excitation signal may include at least a first excitation signal component corresponding to said first one of natural eigenmodes of said at least one measuring tube conducting said mixture. Especially, the exciter arrangement 40 may, as already mentioned, fed with a likewise oscillating excitation current $i_{exc}$, especially a multifrequency current, of adjustable amplitude and adjustable exciter frequency $f_{exc}$ such that this current flows through the exciter coils 26, 36 during operation and the magnetic fields required for moving the armatures 27, 37 are produced in corresponding manner. The excitation current $i_{exc}$ can be e.g. harmonically multifrequent or even rectangular.

The lateral oscillation exciter frequency $f_{excL}$ of a lateral current component $i_{excL}$ of the excitation current $i_{exc}$ required for maintaining the lateral oscillations of the measuring tube 10 can advantageously be so chosen and adjusted in the case of the vibratory transducer shown in the example of an embodiment that the laterally oscillating measuring tube 10 oscillates essentially in a bending oscillation base mode having a single oscillation antinode. Analogously thereto, also a torsional oscillation frequency $f_{excT}$ of a torsional current component $i_{excT}$ of the excitation current $i_{exc}$ required for maintaining the torsional oscillations of the measuring tube 10 can advantageously be so chosen and adjusted in the case of the vibratory transducer shown in the example of an embodiment that the torsionally oscillating measuring tube 10 oscillates essentially in a torsional oscillation base mode having a single oscillation antinode. The two mentioned current components $i_{excL}$ and $i_{excT}$ can, depending on the type of operation selected, be fed into the exciter arrangement 40 intermittently, thus instantaneously each acting as the excitation current $i_{exc}$, or also simultaneously, thus supplementing one another to form the effective excitation current $i_{exc}$. In general, in order to excite two or more natural eigenmodes simultaneously, the excitation signal may include at least a first and a second excitation signal component corresponding to a first one and a second one, respectively, of a plurality of natural eigenmodes of said at least one measuring tube conducting said mixture.

For the above-described case wherein the lateral oscillation frequency $f_{excL}$ and the torsional oscillation frequency $f_{excT}$, with which the measuring the measuring tube 10 is caused to oscillate during operation, are adjusted differently from one another, a separation of the individual oscillation modes can occur both in the exciter signals and also in the sensor signals, by means of the vibratory transducer in simple and advantageous manner, even in the case of simultaneously excited torsional and bending oscillations, e.g. based on a signal filtering or a frequency analysis. Otherwise, an alternating exciting of the lateral and torsional oscillations recommends itself.

For producing and adjusting the excitation current $i_{exc}$, or the current components $i_{excL}$, $i_{execT}$, the measuring device electronics includes a corresponding driver circuit 53, which is controlled by a lateral oscillation frequency adjustment signal $y_{FML}$ representing the desired lateral oscillation exciter frequency $f_{excL}$ and by a lateral oscillation amplitude adjustment signal $y_{AML}$ representing the desired lateral oscillation amplitude of the excitation current $i_{exc}$ and/or the lateral current component $i_{excL}$, as well as, at least at times, by a torsional oscillation frequency adjustment signal $y_{FMT}$ representing the torsional oscillation exciter frequency $f_{excT}$ and by a torsional oscillation amplitude adjustment signal $y_{AMT}$ representing the desired torsional oscillation amplitude of the excitation current $i_{exc}$ and/or the torsional current component $i_{excT}$. The driver circuit 53 can be realized e.g. by means of a voltage-controlled oscillator or a downstream voltage-to-current converter; instead of an analog oscillator, however, also a numerically controlled, digital oscillator can be used to set the instantaneous excitation current $i_{exc}$ or the components $i_{excL}$, $i_{excT}$ of the excitation current.

An amplitude control circuit 51 integrated into the measuring device electronics 500 can serve for producing the lateral amplitude adjustment signal $y_{AML}$ and/or the torsional oscillation amplitude adjustment signal $y_{AMT}$. The amplitude control circuit 51 actualizes the amplitude adjustment signals $y_{AML}$, $y_{AMT}$ on the basis of instantaneous amplitudes of at least one of the two oscillation measurement signals $s_1$, $s_2$ measured at the instantaneous lateral oscillation frequency and/or the instantaneous torsional oscillation frequency, as well as on the basis of corresponding, constant or variable amplitude reference values for the lateral and torsional oscillations, respectively $W_B$, $W_T$; as appropriate, also instantaneous amplitudes of the excitation current $i_{exc}$ can be referenced for generating the lateral oscillation amplitude adjustment signal $y_{AML}$ and/or the torsional oscillation amplitude adjustment signal $y_{AMT}$; compare FIG. 6. Construction and manner of operation of such amplitude control circuits are likewise known to those skilled in the art. As an example for such an amplitude control circuit, reference is made, moreover, to the measurement transmitters of the series "PROMASS 80", such as are available from the assignee, for example in connection with vibratory transducers of the series "PROMASS I". Their amplitude control circuit is preferably so constructed that the lateral oscillations of the measuring tube 10 are controlled to a constant amplitude, thus an amplitude also independent of the density $\rho$.

The frequency control circuit 52 and the driver circuit 53 can be constructed e.g. as phase-locked loops, which are used in the manner known to those skilled in the art for adjusting the lateral oscillation frequency adjusting signal $y_{FML}$ and/or the torsional oscillation frequency adjusting signal $y_{FMT}$ continuously for the instantaneous eigenfrequencies of the measuring tube 10 on the basis of a phase difference measured between at least one of the oscillation measurement signals $s_1$, $s_2$ and the excitation current $i_{exc}$ to be adjusted, respectively the instantaneously measured excitation current $i_{exc}$. The construction and use of such phase-locked loops for the driving of measuring tubes at one of their mechanical eigenfrequencies is described in detail in e.g. U.S. Pat. No. 4,801,897. Of course, other frequency control circuits known to those skilled in the art can be used, such as are proposed in U.S. Pat. No. 4,524,610 or U.S. Pat. No. 4,801,897. Furthermore, reference is made to the already mentioned measurement transmitters of the series "PROMASS 80" respecting a use of such frequency control circuits for vibratory transducers. Other circuits suitable for use as driver circuits can be learned from, for example, U.S. Pat. No. 5,869,770 or U.S. Pat. No. 6,505,519.

According to a further embodiment of the invention, the amplitude control circuit 51 and the frequency control circuit 52 are, as shown schematically in FIG. 6, realized by means of a digital signal processor DSP provided in the measuring device electronics 500 and by means of program code correspondingly implemented in such and running therein. The program codes can be stored persistently or even permanently e.g. in a non-volatile memory EEPROM of a microcomputer 55 controlling and/or monitoring the signal processor and loaded upon startup of the signal processor DSP into a volatile data memory RAM of the measuring device electronics 500, e.g. RAM integrated in the signal processor DSP. Signal processors suited for such applications are e.g. those of type TMS320VC33 available from the firm Texas Instruments Inc. It is clear, in this regard, that the oscillation measurement signals $s_1$, $s_2$ need to be converted by means of corresponding analog-to-digital converters A/D into corresponding digital signals for a processing in the signal processor DSP; compare, in this connection, EP-A 866,319 for example. In case required, adjustment signals output from the signal processor, such as e.g. the amplitude adjusting signals $y_{AML}$, $y_{AMT}$, or the frequency adjusting signals $y_{FML}$, $y_{FMT}$, can be, in corresponding manner, converted from digital to analog.

As shown in FIG. 6, the, if appropriate, first suitably conditioned, oscillation measurement signals $s_1$, $s_2$ are additionally sent to a measurement circuit 21 of the measuring device electronics for producing the at least one measured value $X_x$ on the basis of at least one of the oscillation measurement signals $s_1$, $s_2$ and/or on the basis of the excitation current $i_{exc}$.

According to an embodiment of the invention, the measurement circuit 21 is constructed, at least in part, as a flow rate calculator and the measurement circuit serves for determining, in the manner known per se to those skilled in the art, from a phase difference detected between the oscillation measurement signals $s_1$, $s_2$ generated in the case of a measuring tube 10 oscillating laterally at least in part, a measured value $X_x$ serving here as a mass flow rate measured value and representing, as accurately as possible, the mass flow rate to be measured. The measurement circuit 21 can be any, especially digital, measuring circuit already used in conventional Coriolis mass flow measuring devices for determining the mass flow rate on the basis of the oscillation measurement signals $s_1$, $s_2$; compare, in this connection, especially the initially mentioned WO-A 02/37063, WO-A 99/39164, U.S. Pat. No. 5,648,616, U.S. Pat. No. 5,069,074. Of course, other measuring circuits known to those skilled in the art to be suitable for Coriolis mass flow measuring devices can be used, i.e. measuring circuits which measure, and correspondingly evaluate, phase and/or time differences between oscillation measurement signals of the described kind.

Additionally, the measurement circuit 21 can also serve to utilize an oscillation frequency of the at least one measuring tube 11, as measured, for example, on the basis of at least one of the oscillation measurement signals $s_1$, $s_2$, for generating a measured value $X_x$ usable as a density measured value instantaneously representing a density $\rho$ to be measured for the medium or a phase of the medium.

Because the straight measuring tube 10 is, as above described, could be caused to execute lateral and torsional oscillations simultaneously or alternatively, the measurement circuit can also be used to determine a measured value $X_x$ usable as a viscosity measured value and instantaneously representing a viscosity of the medium. For example, the measurement circuit may derive such measured value from the excitation current $i_{exc}$, which, it is known, can serve also as a measure for an apparent viscosity or also a viscosity-density product; compare, in this connection, also U.S. Pat. No. 4,524,610 or WO-A 95 16 897.

It is clear in this connection, without more, for those skilled in the art, that the inline measuring device can determine the separate measured values $X_x$, i.e. mass flow value $X_m$, a density value $X_\rho$, and a viscosity value $X_\eta$, respectively, for the various measured quantities x both in a common measuring cycle, thus with equal updating rates, as well as with different updating rates. For example, a very accurate measurement of the usually significantly varying mass flow rate requires usually a very high updating rate, while the comparatively less variable viscosity, $\eta$, of the medium can, where appropriate, be updated at larger separations in time. Additionally, it can, without more, be assumed that currently determined, measured values $X_x$ can be stored temporarily in the measuring device electronics and, therefore, be available for subsequent uses. Advantageously, the measurement circuit 21 can, furthermore, also be implemented by means of the signal processor DSP.

As already mentioned at the start, inline measuring devices with a vibratory transducer, especially Coriolis flowmeters, are widely used in industry for mass flow and density measurement of single-phase liquids or gases due to the high accuracy and flexibility of such devices. However, it is known that inhomogeneities and/or the formation of first and second phases in the flowing medium, for example gas bubbles and/or solid particles entrained in liquids, can lead to the result that a measured value determined in conventional manner assuming a single-phase and/or homogeneous medium will not match with sufficient accuracy the actual value of the quantity x whose measurement is desired, for example the mass flow rate m, i.e. the measured value must be appropriately corrected. This preliminarily determined, provisionally representing, or at least corresponding, value of the physical quantity x whose measurement is desired, which value, as already explained, can, for example, be a phase difference $\Delta\phi$ measured between the oscillation measurement signals $s_1$, $s_2$, or a measured oscillation frequency, of the measuring tube 11, is, consequently, referenced in the following as an initial measured value, or also a apparent value, $X'_x$. From this initial measured value $X'_x$, i.e. apparent mass flow value $X'_m$ or apparent density value $X'_\rho$, the evaluation electronics 21, in turn, finally derives the measured value $X_x$ representing the physical, measured quantity x sufficiently accurately, whether the physical, measured quantity x is the mass flow rate, the density, or the viscosity. Considering the very comprehensive and very well documented and detailed state of the art, it can be assumed that the determination of the initial measured or apparent value $X'_x$, which, for practical purposes, corresponds to the measured value generated in conventional manner, presents no difficulties for those skilled in the art, so that the initial measured value $X'_x$ can be taken as a given for the further explanation of the invention.

There is already discussion in the state of the art with reference to the mentioned inhomogeneities in the medium that these can immediately show up both in the phase difference measured between the two oscillation signals $s_1$, $s_2$ and in the oscillation amplitude or the oscillation frequency of each of the two oscillation measurement signals, respectively excitation current, thus in practically all of the usually measured, directly or indirectly, operational parameters of measuring devices of the described kind. This is true, especially in the case of the operational parameters determined with a laterally oscillating measuring tube, as is treated in WO-A 03/076880 or U.S. Pat. No. 6,311,136, U.S. Pat. No. 6,505,519; it can, however, also not always be excluded for operational parameters measured with a torsionally oscillating measuring tube—compare, in this connection, especially U.S. Pat. No. 4,524,610.

Further investigations have, however, led to the surprising discovery that, besides the well-known bubble effect there must be other significant effects that influence the measurement accuracy of In-line measuring devices with vibratory-transducer. Consequently, density and mass flow errors $E_\rho$, $E_{\dot{m}}$, may not directly coupled as assumed in the classical bubble theory.

For motivation, FIG. 7 shows exemplarily a typical behaviour of a conventional Coriolis flowmeter under multi phase condition. To explain the positive measurement errors in mass flow together with negative measurement errors in density, which occur at low void fractions and which can not explained with the classical bubble theory, a novel model, which we called "moving resonator model" (MRM) was created. The Coriolis working principle under ideal conditions is our starting point for conceptualizing this moving resonator. Then we consider the acoustic properties of liquid-gas mixtures and design an approximate resonator model. Finally, this resonator is implemented into the flow meter which allows calculation of density and mass flow errors during on-line operation. For increasing the accuracy of the resonator model, the error compensation based on the "bubble theory" may be included or integrated in this computation.

Figure 8:
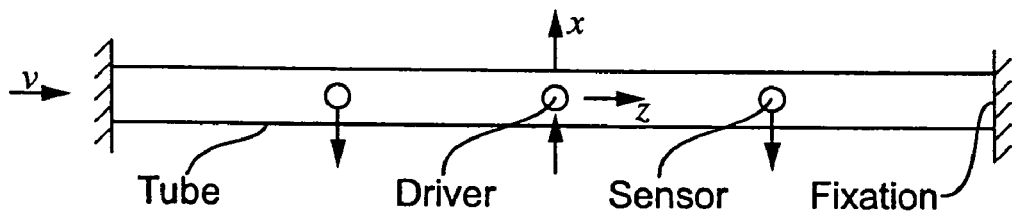
FIG. 8 shows schematically a Coriolis tube model.

At first, the working principle of the Coriolis mass flowmeter under ideal conditions should be reminded by means of an appropriate tube model. Commercially available inline meters exhibit a broad variety of tube shapes. Nevertheless, here only the single straight tube, shown in FIG. 8, is regarded without any loss of generality. Typically, the tube with rigid supports at both ends vibrates in its first eigenmode usually with constant amplitude. It is forced by a driver placed at the centre to compensate dissipated energy. In the presence of flow, Coriolis forces are generated by the moving fluid in the inlet and the outlet of the tube having opposite directions because of the opposite sense of their local rotation. Consequently, in case the Coriolis mode is excited only due to mass flow, said mode is not forced at its natural resonance frequency, but at the current frequency of the driving mode. The time shift between two harmonic sensor signals measured at the inlet and the outlet of the tube corresponds to the mass flow. The information needed for the measurement of flowing fluid can be derived by evaluating the governing equation of Coriolis flowmeters based on Bernoulli's beam equation $$E_t I_t \frac{\partial^4 x}{\partial z^4} + (A_t \rho_t + A\rho)\frac{\partial^2 x}{\partial t^2} + 2A\rho v \frac{\partial^2 x}{\partial t \partial z} = 0, \quad (1)$$

while damping and driver forces are neglected, where x is the displacement in vertical direction and z is the horizontal coordinate, $E_t$ is Young's modulus and $I_t$ is the second moment of area. $A_t$ and $A$ define the areas of cross-section and $\rho_t$ and $\rho$ are the densities of the tube and the fluid, respectively. The first term represents the bending force layer of the tube, the second term gives the ordinary inertial force layers of tube and fluid and the third term on the left hand side gives the Coriolis force, where v is the velocity of the fluid. As mentioned above, the tube of length l is fixed at both ends $$x(z = \pm l/2, t) = 0, \quad (2)$$

$$\frac{\partial x}{\partial z}(z = \pm l/2, t) = 0. \quad (3)$$

In the first instance, we neglect the Coriolis force and solve Eq. (1), (2) and (3) by separation of variables. A detailed derivation can be found in [Rieder, A., *Modeligestützte Auslegung und Realisierung eines Coriolis-Massedurchflußmessers mit einem geraden Meßohr*, Fortschr.-Ber VDI Reihe 8 Nr. 731, *VDI Verlag, Düisseldorf,* 1998] and [Raszillier, H., and Durst, F., *Coriolis Effect in Mass Flow Metering, Arch. Appl. Mech.,* 61, pp. 192 214, 1991]. To simplify the treatment, a spatial transformation $$\zeta = \frac{2}{l}z \quad (4)$$

is introduced.

Figure 9:
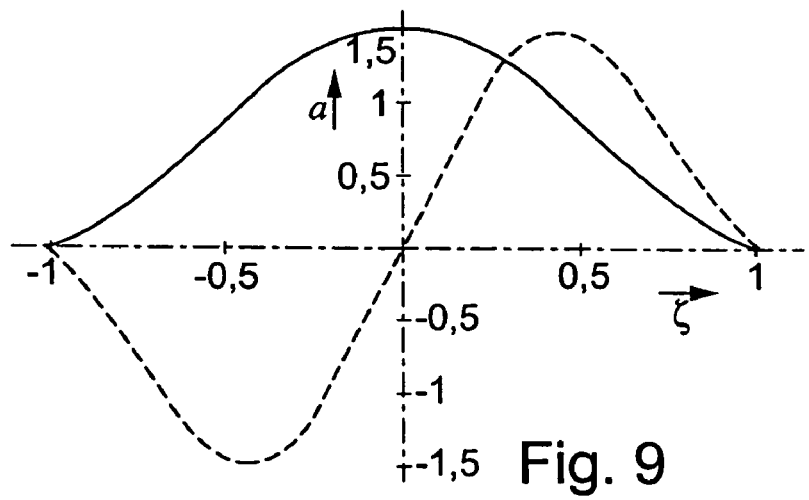
FIG. 9 shows orthonormal eigenforms of the driving mode (solid) and the Coriolis mode (dashed)

For further explaining the invention, we are interested exemplarily in the first two eigenmodes. For a better illustration, the first one we have denote with the subscript D, which represents the so called driving mode (see also above). For the second one, we have selected the Coriolis mode, hereinafter denoted with the subscript C. As explained above, the oscillation form of the Coriolis mode does correspond with the deflection caused by Coriolis forces within the flowing mixture under the selected driving mode. In FIG. 9 the symmetric driving mode and the antisymmetric Coriolis mode for a single straight measuring tube are shown. The corresponding eigenvalues $\gamma_D$ and $\gamma_C$ may take the values 2.365 and 3.926, for example, and the corresponding normalized eigenforms $a_D$, $a_C$ and resonance frequencies $f_D$, $f_C$, respectively are given by:

$$a_D(\zeta) = \frac{\cosh\gamma_D\cos(\gamma_D\zeta) - \cos\gamma_D\cosh(\gamma_D\zeta)}{\sqrt{\int_0^1 (\cosh\gamma_D\cos(\gamma_D\tilde{\zeta}) - \cos\gamma_D\cosh(\gamma_D\tilde{\zeta}))^2 d\tilde{\zeta}}}, \quad (5)$$

$$a_C(\zeta) = \frac{\sinh\gamma_C\sin(\gamma_C\zeta) - \sin\gamma_C\sinh(\gamma_C\zeta)}{\sqrt{\int_0^1 (\sinh\gamma_C\sin(\gamma_C\tilde{\zeta}) - \sin\gamma_C\sinh(\gamma_C\tilde{\zeta}))^2 d\tilde{\zeta}}}. \quad (6)$$

$$\omega_D = 2\pi f_D = \left(\frac{2\gamma_D}{l}\right)^2 \sqrt{\frac{E_t I_t}{A_t \rho_t + A\rho}}. \quad (7)$$

$$\omega_C = 2\pi f_C = \left(\frac{2\gamma_C}{l}\right)^2 \sqrt{\frac{E_t I_t}{A_t \rho_t + A\rho}}$$

For an air filled, practically empty steel tube and a water filled steel tube with inner radius 0.05 m, wall thickness 0.004 m and length 1.5 m the real driving frequency may about 286.7 Hz for air and 218.6 Hz for water. By converting Eq. (7), the fluid density $\rho$ depends on the driving frequency $\tilde{f}_D$ currently measured:

$$\rho = -\frac{A_t \rho_t}{A} + \frac{2^2 \gamma_D^4 E_t I_t}{\pi^2 l^4 A} \cdot \frac{1}{\tilde{f}_D^2} = c_0 + c_1 \cdot \frac{1}{\tilde{f}_D^2}. \quad (8)$$

To determine the mass flow, we specify the decomposed approximation of the harmonic solution $$x(\zeta,t) = \Re\{(A_D a_D(\zeta) + A_C a_C(\zeta))e^{j\omega_D t}\}, \quad (9)$$

with the complex modal amplitudes $A_D$, $A_C$ and the eigenforms $a_D$, $a_C$. Next we insert Eq. (9) with Eq. (4), (5) and (6) into the left hand side (LHS) of Eq. (1), multiply it with Eq. (6) and integrate along the tube $$\int_{-1/2}^{1/2}(LHS\ Eq.(1))a_D(z)dz = 0$$

$$\int_{-1/2}^{1/2}(LHS\ Eq.(1))a_C(z)dz = 0. \quad (10)$$

As result of this modal decomposition, we obtain $$A_C = \frac{k_C}{(1-\omega_D^2/\omega c^2)} \cdot j\omega_D c_{CD} \dot{m} A_D, \quad (11)$$

where $$k_C = (E_t I_t (2\gamma_C/l)^4)^{-1}, \quad (12)$$

$$c_{CD} = \frac{2}{l} \int_{-1}^{1} a'_D(\zeta) a_C(\zeta) d\zeta, \quad (13)$$

$$\dot{m} = A\rho v \quad (14)$$

and where $k_C$ yieldingness, m is the mass flow rate, and $c_{CD}$ is Coriolis coupling coefficient, respectively, which represents the coupling between the driving mode and the Coriolis mode. As mentioned above, the Coriolis mode $A_C$ is excited by the driving mode $A_D$ via the mass flow. Finally, the mass flow is related with the time shift $\Delta t$ between the two harmonic sensor signals by $$\dot{m} = \frac{(1-\tilde{\omega}_D^2/\omega_C^2)}{k_C c_{DC}} \cdot \Re\left\{\frac{A_C}{j\tilde{\omega}_D A_D}\right\} \frac{\Delta t/2}{} = c_2 \cdot \Delta t. \quad (15)$$

The modal amplitudes $A_D$, $A_C$ can be derived from the sensor signals, for instance in conventional way by building sum and difference followed by synchronous demodulation.

To understand the error mechanism in multi-phase conditions, we are further interested in the global acoustic properties of the liquid-gas mixture. To get an appropriate model, we neglect the local existence of discrete gas bubbles. For small amount of gas, the bubbles are usually small compared with the tube diameter and they are homogenously distributed. At this approximation level, the presence of bubbles manifests itself only in the modification of sound speed c and density $\rho$, uniform in the whole volume $$c = \left(\frac{\alpha}{c_g^2} + \frac{(1-\alpha)^2}{c_l^2} + \frac{\alpha(1-\alpha)}{\gamma p}\rho_l\right)^{-\frac{1}{2}}, \quad (16)$$

$$\rho = \rho_l(1-\alpha). \quad (17)$$

Figure 10:
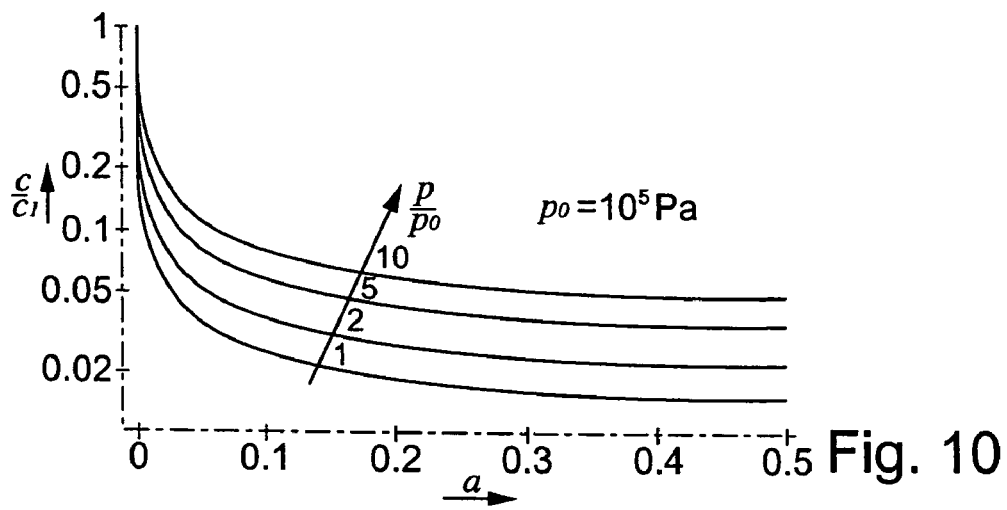
FIG. 10 shows a dependency of sound velocity on gas concentration and pressure.

Sound velocities in the gas, fluid and mixture are denoted by $c_g$, $c_l$ and c. Furthermore, $\rho_l$, $\rho$ and $\gamma$ are the density of liquid, the density of mixture and the adiabatic constant, respectively. The parameters, which has to be taken into account, are the gas volume concentration $\alpha$, also named void fraction, and the static pressure p. FIG. 10 shows the dependency of sound velocity on gas concentration for different pressures when the liquid phase is water and the gas phase is air. According to Eq. (16), the sound velocity in the mixture decreases dramatically even with a small gas concentration. If for example 1.5% air at $10^5$ Pa is injected, the sound velocity of water decreases from 1460 m/s to 95 m/s. This can be explained as a small amount of weak gas decreases the stiffness of the mixture greatly. The reduced sound velocity, in turn, decreases the resonance frequency of the mixture in the tube, which will be discussed below.

Knowing the mixture properties, we would be able to describe the acoustic behaviour of the fluid in a laterally oscillating tube now. Following our derivation, we are especially interested in the lowest dominant eigenmode in the circular tube cross-section. In other words, an essential idea of the model is that under multi phase flow conditions, the mixture inside the tube behaves like a resonator, which can be characterized by at least one effective resonance frequency $f_0$ and an effective mass $m_0$.

For estimating these parameters, we evaluate the wave equation (1) in this cross-section domain $$\Delta\phi - \frac{1}{c^2}\ddot{\phi} = 0, \quad (18)$$

where $\phi$ is the velocity potential and c is the sound velocity. The acoustic pressure p and the velocity vector v can be calculated by means of $$p = -\rho\dot{\phi}, \quad (19)$$

$$\underline{v} = \nabla\phi. \quad (20)$$

Along the tube, the physical quantities keep constant, thus the axial coordinate can be omitted. Since a tube of circular cross-section with radius R is concerned, Eq. (18) is expressed in cylindrical coordinates (r, $\theta$)

$$\frac{\partial^2 \phi}{\partial r^2} + \frac{1}{r}\frac{\partial \phi}{\partial r} + \frac{1}{r^2}\frac{\partial^2 \phi}{\partial \theta^2} - \frac{1}{c^2}\frac{\partial^2 \phi}{\partial t^2} = 0. \quad (21)$$

For a tube at rest, the radial velocity along the tube wall vanishes. The corresponding boundary condition is $$\left.\frac{\partial \phi}{\partial r}\right|_{r=R} = 0. \quad (22)$$

Similar as done with Eq. (1), (2), and (3), we can solve Eq. (21) and (22) by separation of variables. Under these circumstances, the solution relies on the Bessel function of the first kind. The eigenvalues represent zero crossings of this function and the lowest one is given by $\lambda_0 = 1.842$. The corresponding lowest eigenfrequency $f_0$ of this fluid resonator, which models the acoustic behavior of the mixture volume within the measuring tube, can be calculated with $$f_0 = c\frac{\lambda_0}{2\pi R} = \frac{1}{2\pi}\omega_0 \quad (23)$$

Figure 11:
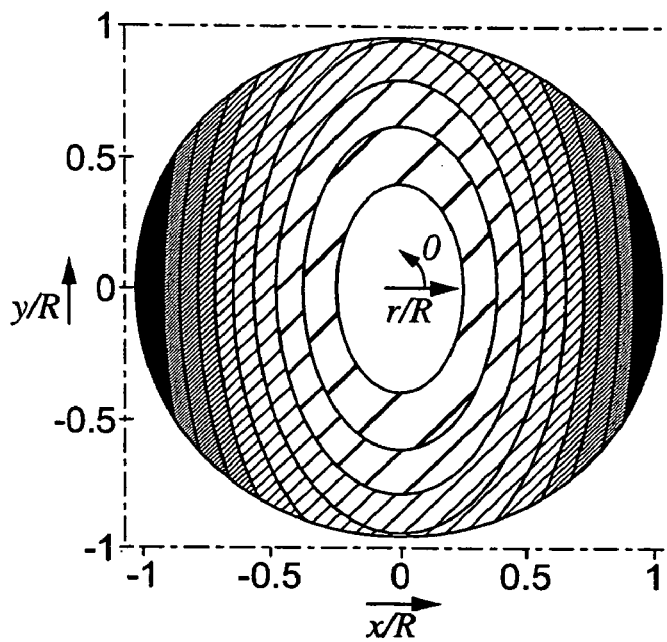
FIG. 11 shows the X-Component of the velocity field in the tube cross-section.

Continuing our example as described above for a conduit with radius R=0.05 m, the resonance frequency may fall down from 8557 Hz for pure water to 555 Hz for the mixture. The corresponding velocity field of the primary eigenform based on the Bessel function is shown in FIG. 11. The maximum velocity of the x-component appears in the central region.

Because the resonance frequency of a single-phase flow resonator is usually much higher than the driving frequencies of Coriolis flow meters, the corresponding resonator effect is negligible compared with the typical magnitude of multiphase related errors. Contrary, because gas entrained in liquid reduces the resonance frequency significantly, such that the sound speed in a mixture is often lower than that in either of its individual phases and/or components, in this case, the resonator effect plays a non-negligible role. When a vibrating measuring tube drives such a mixture, the Coriolis flowmeter "feels" a different density from the real one, and by extension, a different mass flow rate.

Figure 12A:
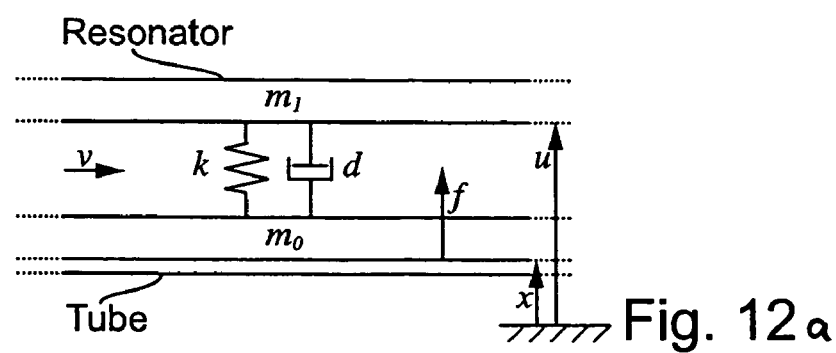
FIG. 12a, b show a model for a moving resonator forced by the tube.

As stated above, another important parameter next to the resonance frequency $f_0$ of the fluid resonator is the effective mass $m_0$ of the resonator. Because the first eigenmode of the resonator could assume to be the dominant mode, here we use only the modal mass layer of said first eigenmode to model an associated single-mass resonator with effective mass $m_0$, while all masses of higher modes are collected in the inactive modal mass layer m' which sticks to the tube wall. Consequently, the fluid resonator could be seen as a substantially single-degree forced excitation system [L. Meirovitch, *Elements of Vibration Analysis*, McGraw-Hill, New York, 1986.], where $m_0$ is the mass, $k_0$ is the spring constant and $d_0$ is the damping coefficient. Using the resonance frequency $f_0$ of the resonator as well as the modal mass layers $m_0$ of resonator and inactive mass m' we can design the resonator model as shown in FIG. 12*a*.

Active and inactive masses $m_0$, m' can be quantified by exploiting the orthogonality of the eigenforms. With the corresponding mass fractions $r_1$=0.837 and $r_0$=0.163 and the tube cross-section area A, the following equation holds $$A\rho = m = \sum_{i=1}^{\infty} m_i = m_1 + \sum_{i=2}^{\infty} m_i = m_0 + m' = A\rho(r_1 + r_0). \quad (24)$$

By replacing $\rho=\rho_l(1-\alpha)$ with $\rho=\rho_l(1-3\alpha)$ in Eq. (24) the "bubble effect" included in the model.

Figure 12B:
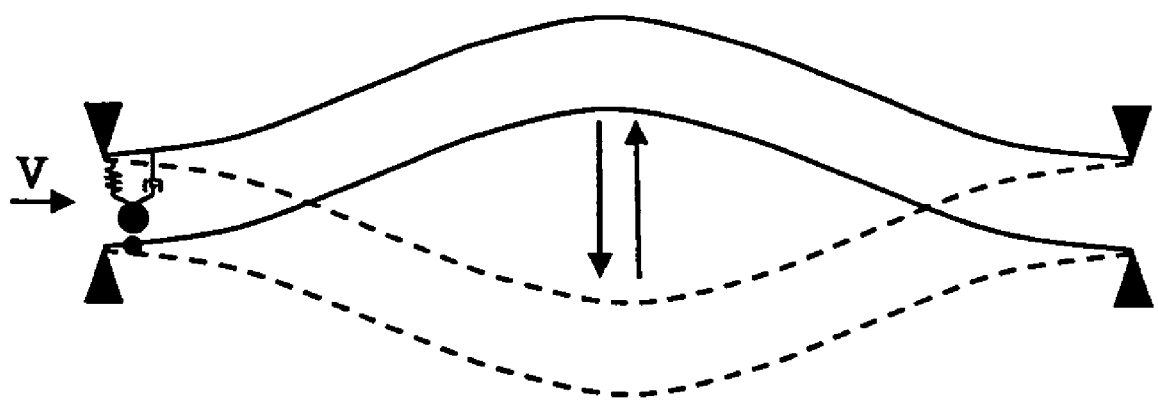

Additionally, we have found that the moving effect of the resonator should not be ignored, since the mixture flows along the measurement tube. As depicted in FIG. 12*b*, in the first half of the tube, the resonator is at the stage of being activated, because it encounters the increase of the tube amplitude until the central point; on the contrary, it is suppressed in the second half of the tube until leaving. This asymmetry gives rise to an asymmetrical component in the reaction force layer of the resonator, causing a measurement error to mass flow rate. The density measurement is almost insensitive to the asymmetry, so the deviation of the mass flow error and density error is reasonably explained. When mixture does flow the fluid resonator moves along the tube virtually.

As shown in FIG. 12*a*, for any movement in x-direction the measuring tube represents the oscillating boundary of the fluid domain which forces vibrations in the mixture. Due to the interaction between the moving resonator and the vibrating tube, a reaction force layer F responds to the tube wall motion.

For estimating fluid resonator's resonance frequency $f_0$, now we are interested in the transfer function H describing the dynamic relationship between the oscillating boundary X and force layer F. Establishing the differential equations of motion and applying Laplace transformation we get the transfer function H(s) in the Laplace domain $$H(s) = \frac{F(s)}{X(s)} = \frac{(k+ds)s^2 m_0}{m_0 s^2 + ds + k} + m' s^2 \quad (25)$$

$$= s^2 \left[ m' + m_0 \frac{1 + \frac{s}{\omega_0 Q_0}}{1 + \frac{s}{\omega_0 Q_0} + \frac{s^2}{\omega_0^2}} \right]$$

where $$\omega_0 = 2\pi f_0 = \sqrt{\frac{k_0}{m_0}} \quad (26)$$

and the quality factor $Q_0$ of the fluid resonator is then given by $$Q_0 = \frac{1}{d_0} \sqrt{k_0 m_0}. \quad (27)$$

Further, we assume the resonator moves through the oscillating tube with the velocity v. Therefore the axial coordinate z is coupled to the time domain by the relationship $$z = vt - l/2. \quad (28)$$

Figure 13:
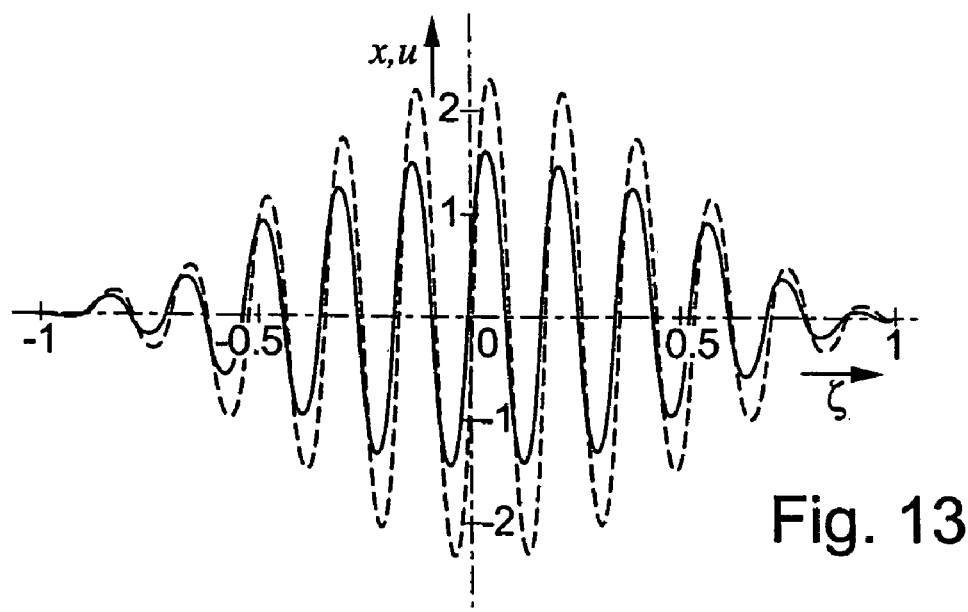
FIG. 13 shows amplitudes of tube x (solid) and resonator u (dashed)

The curves in FIG. 13 are based on the equations above and they are related to the driving mode. The solid one being the track of the inactive mass m' sticking to the tube and the dashed one being the effective resonator mass $m_0$, moving along the conduit. It can be seen that on the way through the tube an amplitude difference and phase shift occurs. Combining Eq. (4), (5), (6), (9), (25), and (28), now we can calculate the reaction force F. In order to obtain the force layer F in space, the time domain is transferred back to the space domain by using the inverse relationship to Eq. (28). Consequently, this back transformation results in $$\underline{F}(z) = \{L^{-1}[H(s)L(x(z = vt - l/2)e^{j\omega_D t})]e^{-j\omega_D t}\}|_{t=\frac{z+l/2}{v}} \quad (29)$$

where L denotes the Laplace operator.

With the assumption $F(z)=F_D(z)A_D+F_C(z)A_C$ and the transformation as defined in Eq. (4) we can decompose Eq. (29) to get the modal components of the force layer F.

The reaction force layer of the resonator for the selected mode $F_i$ may calculated as follows:

$$\underline{F_i}(\xi) = \left\{ L^{-1}\left[ H(s)L\left(a_{ii}\left(\xi \to \frac{2v}{l}t - 1\right)e^{j(2\pi f_2)t}\right)\right]e^{-j(2\pi f_i)t} \right\}_{t=\frac{(\xi+1)l}{2v}} \quad (30)$$

As mentioned above, here we are interested especially in the components corresponding to the driving mode and the second mode:

$$\underline{F_D}(\zeta) = \{L^{-1}[H(s)L(a_D(\zeta = 2vt/l - 1)e^{j\omega_D t})]e^{-j\omega_D t}\}|_{t=\frac{l(\zeta+1)}{2v}} \quad (31)$$

-continued $$\underline{F}_C(\zeta) = \{L^{-1}[H(s)L(a_C(\zeta=2vt/l-1)e^{j\omega D^t})]e^{-j\omega D^t}\}|_{t=\frac{l(\zeta+1)}{2v}}$$

Each modal component $F_D$, $F_C$ of the force layer F is a complex and asymmetric function. For error calculation, these forces are decomposed in their real components $\Re\{F_D, F_C\}$ and imaginary components $\Im\{F_D, F_C\}$ as well as symmetric and antisymmetric components.

As stated above, beside the "moving resonator effect", the "bubble effect" should also take into account in the MRM, which reduces the effective mass of the resonator. To include the "bubble effect" in Eq. (24), $\rho=\rho_l(1-\alpha)$ should be replaced with $\rho=\rho_l(1-3\alpha)$. Using said modified Eq. (24) the transfer function H(s) as defined in Eq. (25) can be explained with:

$$H(s) = \frac{F(s)}{X(s)} \tag{32}$$

$$= s^2\left[\rho_L A(1-3\alpha)r' + \rho_L A(1-3\alpha)r_0 \frac{1+\frac{s}{\omega_0 Q_0}}{1+\frac{s}{\omega_0 Q_0}+\frac{s^2}{\omega_0^2}}\right],$$

where r' and $r_0$ are the fractions of the mass sticking to the wall and following the oscillation. Typical values for r' and $r_0$ may about 0.16 and 0.84, respectively.

For estimating fluid resonator's resonance frequency $f_0$ and concentration $\alpha$, we can use the real part of Eq. (32), which can be further simplified by hiding medium geometry properties within a set of discrete coefficients:

$$\tilde{\rho}_i = \rho_L(1-3\alpha)\Re\left\{\left[r_{0i}+r_{1i}\frac{1+j\frac{\tilde{f}_i}{f_0 Q_0}}{1+j\frac{\tilde{f}_i}{f_0 Q_0}-\frac{\tilde{f}_i^2}{f_0^2}}\right]\right\} = c_{0i}+c_{1i}\frac{1}{\tilde{f}_i^2} \tag{33}$$

where the LHS (left hand side) of Eq. (33) represents the apparent density reading from the meter and $\tilde{f}_t$ is the disturbed frequency currently measured. The subscript i indicates the respective mode, and may, for example, correspond to the numbers of antinodes of the oscillation form of the tube. Note the term "disturbed" here means the change due to the two- or multi phase flow. In order to determine the two coefficients $c_{0i}$, $c_{1i}$ on the right hand side (RHS) of Eq. (33) for each selected mode, two reference resonance frequencies, $\tilde{f}_{Wi}$ for pure or reference liquid, i.e. water, and $\tilde{f}_{Ai}$ for pure or reference gas, i.e. air (i=1, 2 . . . ), should be provided.

If we consider the fact that on the one hand the driving frequency $f_D$ is often much lower than the resonance frequency $f_0$ of the resonator, and on the other hand the quality factor $Q_D$ of the system and, thus, the quality factor $Q_0$ of the moving resonator are usually high, especially in case of relatively small amount of gas, in Eq. (33) the term $\tilde{f}_i 1 f_0 Q_0$ approaches zero practically.

According to the theory above, now we want evaluate the mass flow error $E_m$ and the density error $E_\rho$ in two-phase conditions. Therefore, all fluid-dependent terms in Eq. (1) are replaced by the reaction force F of the moving resonator in Eq. (29)

$$E_t I_t \frac{\partial^4 x}{\partial z^4} + A_t \rho_t \frac{\partial^2 x}{\partial t^2} + E = 0. \tag{34}$$

Analogous to Eq. (10), we perform a modal decomposition $$\int_{-1/2}^{1/2}(LHS \text{ Eq. (33)})\alpha_i(z)dz=0. \tag{35}$$

where the index i denotes the selected eigenmode, i.e. the driving mode and the Coriolis mode. Since density measurement is only determined by the symmetrical decomposition of the reaction force layer F, the moving effect that causes asymmetry has negligible influence on it. Therefore, we can simplify the system under Eq. (34) to $$\int_{-1/2}^{1/2}(LHS \text{ Eq.(33)})\alpha_D(z)dz=0. \tag{36}$$

Integrating Eq. (34), as indicated above, with the respective mode shape function as of the selected mode leads then to:

$$\left\{EI\left(\frac{2\gamma_t}{l}\right)^4 - (2\pi\tilde{f}_t)^2 A_t\rho_t + \frac{1}{2}\int_{-1}^{1}F_i a_i d\xi\right\}\underline{A}_i = 0 \tag{37}$$

where $\gamma_i$ and $A_i$ are mode constant and amplitude of the selected eigenmode, respectively. Because in the example used herein the driving mode is used for the first mode and the Coriolis mode is use for the second mode the mode constant and amplitudes are given with $\gamma_1=\gamma_D$, $\gamma_2=\gamma_C$, and $A_1=A_D$, $A_2=A_C$, respectively.

As one result, we obtain Eq. (38) for the driving mode, which is adapted to determine the disturbed or apparent density $\tilde{\rho}$ from the actual driving frequency $\tilde{f}_D$ in an iterative calculation procedure including a number n of calculating cycles:

$$2\pi\tilde{f}_{D,n} = \tilde{\omega}_{D,n} \tag{38}$$

$$= \left(\frac{2\gamma_D}{l}\right)^2 \sqrt{\frac{E_t I_t}{\underbrace{A_t\rho_t + A\left(-\frac{1}{2A(\tilde{\omega}_{D,n-1})^2}\int_{-1}^{1}\Re\{f_D(\zeta)\}a_D(\zeta)d\zeta\right)}_{\tilde{\rho}}}}$$

$$\tilde{\rho}_n = \left(\frac{2\gamma_D}{l}\right)^4 \frac{E_t I_t}{A\cdot(2\pi\tilde{f}_{D,n-1})^2} - \frac{A_t}{A}\rho_t$$

With Eq. (38), the density error $E_\rho$ between true or reference density, $\rho$, and apparent density, $\tilde{\rho}$, in two-phase conditions may derived based on the following equation:

$$E_\rho = \frac{\tilde{\rho}}{\rho} - 1 = -\frac{1}{2\tilde{\omega}_D^2 A\rho}\int_{-1}^{1}\Re\{f_D(\zeta)\}a_D(\zeta)d\zeta - 1. \tag{39}$$

In Eq. (39), the first term represents the bending force of the tube, where $E_t$ is Young's modulus of the tube wall, $I_t$ is the second moment of tube cross-section area, x is the displacement of the tube in vertical direction and z is the horizontal coordinate. The second term represents the ordinary inertia force of the tube, where $A_t$ is the area of tube cross-section and $\rho_t$ is density of the tube.

Considering Eq. (32) we need to know the concentration α to estimate the density error $E_\rho$. Hence, from Eq. (30), resonance frequency of selected mode i is given by $$\tilde{f}_i = \frac{1}{2\pi} \sqrt{\frac{EI}{A_t\rho_t - \frac{1}{2(2\pi\tilde{f}_i)^2}\int_{-1}^{1}\tilde{R}\{F_i\}a_i d\xi}} \left(\frac{2\gamma_i}{l}\right)^2 \quad (40)$$

where the subscript i indicates the mode actually selected. Eq. (40) can be simplified to get the resonance frequency or each selected mode:

$$\tilde{f}_i = \frac{1}{2\pi} \sqrt{\frac{EI_i}{A_M\rho_M + A\rho_L(1-3\alpha)\left(r_0 + r_1\frac{1}{1-\frac{\tilde{f}_i^2}{f_0^2}}\right)}} \left(\frac{2\gamma_i}{l_i}\right)^2 \quad (41)$$

Neglecting the pure gas density, the coefficients $c_{0i}$, $c_{1i}$ in Eq. (33) could be solved for the two pure reference fluids based on the following system:

$$c_{0i} = \frac{-\rho_W \tilde{f}_{Wi}^2}{-\tilde{f}_{Wi}^2 + \tilde{f}_{Ai}^2} \quad (42)$$

$$c_{1i} = \frac{\rho_W \tilde{f}_{Wi}^2 \tilde{f}_{Ai}^2}{-\tilde{f}_{Wi}^2 + \tilde{f}_{Ai}^2}$$

Also taking into account Eq. (24), Eq. (33) can be further simplified:

$$\rho_L(1-3\alpha)\left[1 + r_{1i}\frac{\tilde{f}_i^2}{f_0^2 - \tilde{f}_i^2}\right] = c_{0i} + c_{1i}\frac{1}{\tilde{f}_i^2}. \quad (43)$$

To characterize how the system resonance changes with different single phase media inside, the resonance frequencies $\tilde{f}_{Ai}$ for the pure or reference gas, i.e. air, and $\tilde{f}_{Wi}$ for the pure or reference liquid, i.e. water, may be needed. In the MRM, the values for such resonance "pure" frequencies $\tilde{f}_{Ai}$, $\tilde{f}_{Wi}$, which can be easily obtained by calibration, are used to determine the two coefficients $c_{0i}$, $c_{1i}$ on the RHS of Eq. (43), respectively, for the corresponding mode, respectively. As a result of the system provided by Eq. (33) or (43) there are two principal unknowns in the MRM, the concentration α, i.e. the gas volume fraction, and the resonance frequency $f_0$ of the fluid resonator. Additionally, if the liquid phase density $\rho_L$ is not provided or varies in time significantly, it should be determined together with fluid resonator's resonance frequency $f_0$ and concentration α. For example, density value $\rho_L$ may be inputted manually on site or from a remote control room, based on knowledge of the medium to be measured, or may be transmitted from an external density meter, for example via field bus, to the measuring device electronics during operation. Alternative or in addition reference density, PL can also be determined initially for the fluid directly by means of the measuring device electronics, especially in case the medium can assumed as to be a single phase fluid or, medium can assumed as to be largely homogeneous. In line with this reference density $\rho_L$ may be determined using a density measured value $X_\rho,0$ likewise stored in the measuring device electronics, with the stored density measured value $X_\rho,0$ representing a density of the medium previous measured during operation, i. e. if the medium was actually homogeneous or the measured medium could assumed to be homogeneous.

Based on the system of Eq. (41) we can use the driving frequency $\tilde{f}_D$ currently measured to estimate resonator's frequency $f_0$, and concentration α. Due to the complexity of the tube structure, e.g. the additional mass of the driver in the middle of the tube, it is not advisable to simulate the both modes with only a simple single straight tube model. Moreover, two modes are considered separately, which gives two sets of tube geometry parameters. Unfortunately, under normal operational conditions typical inline meters as described herein, i.e. a Coriolis flow meter, may supply directly only one measured value, which is need to solve these unknowns, which is obviously insufficient. In order to minimize the driving energy, conventional Coriolis meters usually excite the measurement tubes at the first resonance frequency, which in fact equals the resonance frequency $\tilde{f}_1$ as mentioned above. Further, in most Coriolis meters this frequency is processed afterwards to compute the density of the medium inside the measuring tube. Consequently, the resonance frequency $\tilde{f}_1$ of the measurement tube should be available in most Coriolis meters may use for the one measured value needed.

As explained above, since there is only one resonance frequency for the unknowns, an auxiliary measurement is necessary to provide additional information and solve the equation system, which may be realized by the measurement of a current disturbed second resonance frequency $\tilde{f}_2$ of a second eigenmode of the measurement tube. Further, it is known that the resonance frequencies of the measurement tube depends also on the inherent properties of the tube such as geometry and material, and the density of the medium inside. In case of two- or multi-phase mixture, the density here refers to the apparent density, which is usually different from the bulk density of the mixture. As explained before, both the "bubble effect" and the "resonator effect" have contributions on this difference. By only knowing one of the mixture actual resonance frequencies, say $\tilde{f}_2$ or $\tilde{f}_2$, it is difficult to know how much contributions the two effects have respectively. Therefore, the at least one measuring tube measurement tube is to be caused, however, to vibrate also in said actual second order-eigenmode ($f_2$-mode), i.e. the Coriolis like mode or a higher mode, and said second eigenmode of the tube has to be considered to obtain the complement for solving the problem. The second order eigenmode of a single straight tube has a higher frequency than the first order eigenmode ($f_1$-mode), usually used for the driving mode. Therefore, under the $f_2$-mode, the resonator that simulates the two-phase mixture shows a different behavior from the $f_1$-mode, usually having more significant effect because in most cases the driving frequency is closer to the resonance frequency $f_0$ of the resonator. On the other hand, the "bubble effect" remains constant as it is independent of drive frequency $f_D = \tilde{f}_2$. Consequently, it is possible to determine the unknown concentration α and the unknown resonator's resonance frequency $f_0$ based on at least two measured disturbed resonance frequencies $\tilde{f}_2$ and $\tilde{f}_2$ of two eigenmodes, i.e. $f_1$-mode and $f_2$-mode, of the measuring tube.

Generally, there are at least two ways for measuring the frequency $\tilde{f}_2$ of the second eigenmode. At the one hand, the second mode of the measurement tube may actively excite at least intermittently, and the resulting vibrations of the tube may analyze. For this first method, one has to drive the tube at either of the sensor positions like what the meter does for the first mode operation. Then the resonator can really driven by the $f_2$-mode frequency, which is provided by frequency $\tilde{f}_2$, and gives a corresponding reaction, which also contributes to the final resonance frequency of the $f_2$-mode.

A second method can base on on-line signal analysis. The signal from a sensor of the meter can be decomposed into various frequency bands, being transferred to a frequency domain. Hence, the resonance frequency of the $f_2$-mode is obtained by an appropriate on-line spectrum analysis, i.e. based on discrete Fourier transformation and/or digital filtering.

Figure 21:
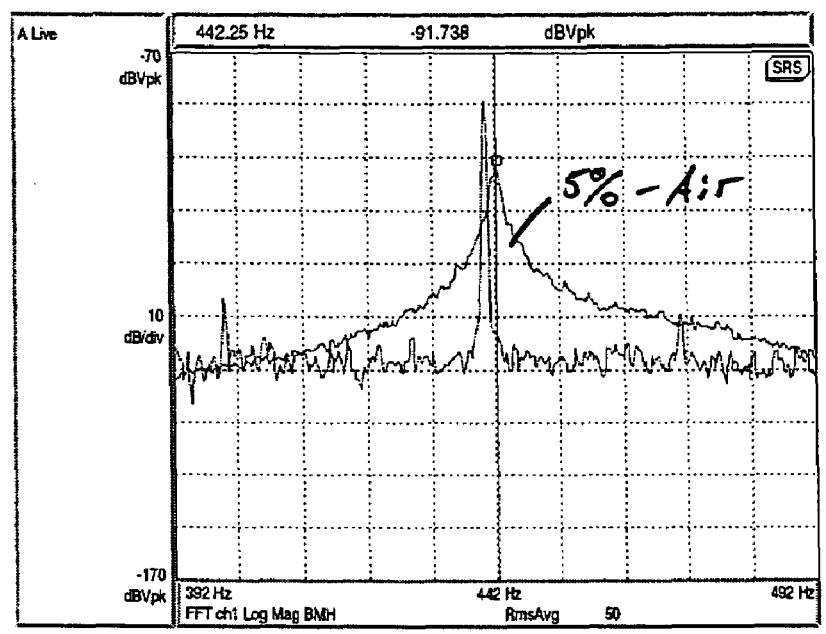
FIG. 21 f1 mode resonance frequencies measured by a spectrum analyzer.
Figure 22:
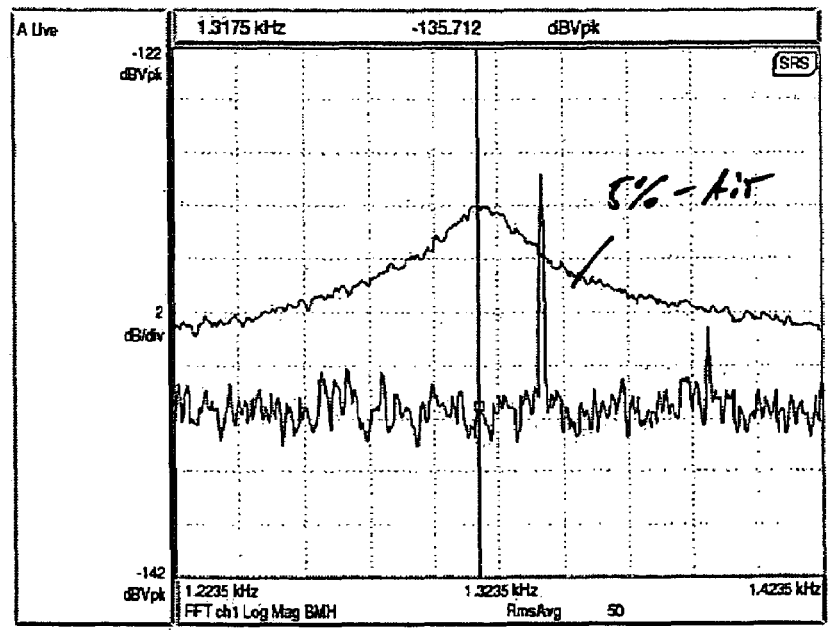
FIG. 22 f2 mode resonance frequencies measured by a spectrum analyzer.

For this, we have found that at least one eigenmode of the tube, i.e. the $f_2$-mode, may also excited at its instantaneous eigenfrequency, if at least one of said first and second mixture phases, currently within said measuring tube, moves relative to the measuring tube and, thus, relative to the other one of said first and second mixture phases. Based on this surprising perception that relative motions of said at least one of the first and second mixture phases can stimulate said at last one measuring tube to vibrate within at least one of a plurality of instantaneous natural eigenmodes of said at least one measuring tube conducting said mixture, it is not necessary to actually drive the tube with the $f_2$-mode by means of the exciter arrangement in order to determine the $f_2$-mode frequency $\tilde{f}_2$ needed. Due to the presence of first and second phases, i.e. gas bubbles within liquid, the $f_2$-mode may activate and set to a sufficient signal level, which enables a frequency analysis of this mode, also without feeding external forces from exciter arrangement to the measuring tube. FIG. 21, 22 depicts an example of measured resonance frequencies taken from a spectrum analyzer. In each of said two frequency plots, the lower of the respective lines represents a widely homogeneous single-phase medium, while the upper of the respective two signal lines represents a two-phase mixture consisting of air-bubbles in water, wherein the concentration of air may have a value of about 5%.

Since at least said second natural eigenmode is stimulated, at least partially, due to motions of at least one of said first and second mixture phase within said measuring tube relative to said measuring tube, it may be helpful to ensure that at least one of the above mentioned natural eigenmodes of the measurement tube is essentially not stimulated by the exciter arrangement at least temporary. Particularly, the relative motion could be caused by flowing the mixture within the measuring tube. To use this effect for compensating the errors identified above, at least temporary the excitation signal may substantially devoid of any excitation signal components, which correspond to said natural eigenmode to be stimulated only due to said relative motion of said mixture phases, and/or which would excite said natural eigenmode via said exciter arrangement. In other words, a first oscillation factor, which represents a relation between said oscillation amplitude of said first natural eigenmode and said signal amplitude of said first excitation signal component causing said measuring tube to vibrate in said first natural eigenmode, is different from a second oscillation factor, which represents a relation between said oscillation amplitude of said second natural eigenmode and a signal amplitude of a second excitation signal component of the excitation signal having a signal frequency corresponding with the instantaneous resonance frequency of said second natural eigenmode. In addition, the first oscillation factor may represent a ratio of said oscillation amplitude corresponding with the first natural eigenmode normalized to said signal amplitude of the first excitation signal component, and the second oscillation factor may represent a ratio of said oscillation amplitude corresponding with the second natural eigenmode normalized to said signal amplitude of the second excitation signal component. Consequently, in operation said excitation signal may adjusted such that said first oscillation factor is less than said second oscillation factor at least temporary. Especially, the signal amplitude of said second excitation signal component of the excitation signal may essentially zero. Further, a signal-to-noise ratio of said second excitation signal component can be less than two. In addition, the excitation signal, fed to said exciter arrangement, may include at least a third signal component corresponding to a third one of a plurality of natural eigenmodes of said at least one measuring tube conducting said mixture. This third excitation signal component may cause the measuring tube to vibrate in said third natural eigenmode with an oscillation amplitude depending at least on an amplitude of said third excitation signal component fed to the exciter arrangement.

In addition, we have found that at least said instantaneous resonance frequency of said second natural eigenmode may significantly vary in time due to at least one of: relative motion of said first mixture and second mixture phases, changes in distribution of at least one of said first mixture and second mixture phases of the mixture within said measuring tube, and changes in a concentration of at least one of said first mixture and second mixture phases of the mixture. Nevertheless, the instantaneous resonance frequency of said first natural eigenmode currently excited via exciter arrangement may also depend on said mixture currently within said measuring tube in a similar manner. Indeed, the instantaneous resonance frequencies of each of the first and second eigenmodes are significantly different from each other.

Because each of said natural eigenmodes has an instantaneous resonance frequency depending on said mixture currently within said measuring tube, each of the corresponding signal components of the oscillation measurement signal has an instantaneous signal frequency corresponding with said instantaneous resonance frequency of said second natural eigenmode. Therefore, said instantaneous signal frequencies of said first and second measurement signal components may further used for selecting said first and second measurement signal component from said oscillation measurement signal for further use in the compensation schemes as described above. Further, we have found that also an instantaneous amplitude of said oscillations within each of said first and second natural eigenmode depend on said mixture within said measuring tube. Therefore, also the signal amplitude of each of said first and second measurement signal components can be used for identifying and for selecting said measurement signal components from the oscillation measurement signal.

Knowing the measured frequencies $\tilde{f}_1$, $\tilde{f}_2$, the two equations developed based on Eq. (43) for first and second eigenmodes, respectively, can be solved. Using that solution, concentration $\alpha$ and resonator's resonance frequency $f_0$ can be obtained as follows:

$$f_0 = \sqrt{\frac{-a_2 - \sqrt{a_2^2 - 4a_1 a_3}}{2a_1}}, \tag{44}$$

$$\alpha = \frac{1}{3}\left[1 - \frac{k_2}{\rho_L r_0 + \rho_L r_1 \frac{1}{1 - \frac{\tilde{f}_2^2}{\tilde{f}_0^2}}}\right], \quad (45)$$

where $a_1 = k_1 - k_2,$ $a_2 = -k_1 \tilde{f}_1^2 + k_2 \tilde{f}_2^2 - r_0 k_1 \tilde{f}_2^2 + r_0 k_2 \tilde{f}_1^2,$ $a_3 = (r_0 k_1 - r_0 k_2)\tilde{f}_1^2 \tilde{f}_2^2,$ $k_1 = c_{01} + c_{11}\frac{1}{\tilde{f}_1^2},$ $k_2 = c_{02} + c_{12}\frac{1}{\tilde{f}_2^2}.$ If the driving mode as described above is selected for the first eigenmode ($f_1$-mode), any other lateral eigenmode of a single straight tube laterally vibrating has a higher resonance frequency than the first eigenmode. Anyway, under the second mode ($f_2$-mode), the resonator that simulates the two-phase mixture shows a different behaviour from the $f_1$-mode. The second order mode usually has more significant effect, because in most cases its (disturbed) resonance frequency $\tilde{f}_2$ is closer to the resonance frequency $f_0$ of the fluid resonator than that of lower order eigenmodes. On the other hand, the "bubble effect" remains constant as it is widely independent of the oscillation frequency. Consequently, it is possible to solve Eq. (44, 45) to get the two unknowns concentration $\alpha$ and resonator's frequency $f_0$ based on the two measured disturbed resonance frequencies $\tilde{f}_1$ and $\tilde{f}_2$ of the $f_1$-mode and the $f_2$-mode, respectively. As indicated by the mode subscript i, the system represented by Eq. (41) eventually is applicable to each mode selected for solving the MRM, particularly also for obtaining the resonance frequency $f_0$ of the resonator. Recalling Eq. (23), the sound velocity in the two-phase mixture could then be calculated from resonance frequency $f_0$.

Taking the same simplification principles for Eqn. (33) and (43), Eq. (39) can be further simplified to the following equation, which gives the prediction for the measured density errors:

$$E_\rho = \frac{(1-3\alpha)}{(1-\alpha)}\left[1 + r_{1i}\frac{\tilde{f}_i^2}{\tilde{f}_0^2 - \tilde{f}_i^2}\right] - 1 \ (i = 1 \text{ or } 2). \quad (46)$$

In order to additionally determine the liquid phase density $\rho_L$, from concentration $\alpha$ or vice versa, Eq. (16) may further utilized. With certain approximation that the two-phase mixture has the compressibility mainly contributed by the gas phase and gets the mass almost exclusively from the liquid phase, Eq. (16) can be further simplified to the following equation to estimate the speed of sound c of the mixture:

$$c = f(\alpha, \rho_L, p) = \left(\frac{\alpha(1-\alpha)\rho_L\kappa_{G0}p_0}{p}\right)^{-\frac{1}{2}}. \quad (47)$$

In Eq. (47), $p_0$ is the atmospheric pressure and $\kappa_{G0}$ is the compressibility of air under this atmospheric pressure. The process pressure p must be measured in order to know the property of the gas phase. Using Eq. (47) the equation system including Eq. (23), (41) can be solved to obtain concentration $\alpha$, resonance frequency $f_0$ of the resonator, and liquid phase density $\rho_L$, respectively.

By evaluating Eqn. (13), (35), we can additionally get the Coriolis coupling coefficient under two- or multi phase mixture condition:

$$\tilde{c}_{CD} = -\frac{1}{2\tilde{\omega}_D A \rho v}\int_{-1}^{1} \Im\{\underline{f}_D(\zeta)\}a_C(\zeta)d\zeta. \quad (48)$$

Further, based on Eq. (37) we can estimate quality factor $Q_0$ of the moving resonator. The driving mode component of the quality factor $Q_D$ of the system, which consists of the vibrating tube and the mixture therein, corresponds with the symmetric component of the imaginary part of Eq. (37)

$$Q_D = \frac{E_t I_t (2\gamma_D/l)^4}{\frac{1}{2}\int_{-1}^{1}\Im\{\underline{f}_D(\zeta)\}a_D(\zeta)d\zeta} = \frac{1}{D_D} \quad (49)$$

Determining this quality factor $Q_D$ of a reference system including a known medium inside, which may have widely known properties experimentally measured, we can also obtain the resonator quality factor $Q_0$ of the fluid resonator from this system quality factor. Taking the same principles as for Eq. (46), Eq. (49) may further simplified to the following equation for determining the system quality factor and the system damping, respectively:

$$Q_D = \frac{c_{11}f_0^3 Q_0}{\rho_L(1-3\alpha)r_1\tilde{f}_1^5} = \frac{1}{D_D} \quad (50)$$

which may utilize for experimental determining fluid resonator's quality factor $Q_0$. In Eq. (50), the quality factor $Q_0$ of the fluid resonator may have much less influence on the total system quality factor compared with resonator's resonance frequency $f_0$, because it has a power of 3. Consequently, a small deviation between the true quality factor $Q_0$ and any estimated quality factor has negligible influence on the accuracy of the system quality factor $Q_D$ to be obtained and the resonator's resonance frequency $f_0$ to be derived therefrom. Consequently, the quality factor $Q_0$ could bee seen as a device parameter, which may obtained empirically based on experimental data in during calibration process of the In-Line meter. For this, we can use also a reference system with widely know homogeneous single-phase media. To improve the accuracy of the In-Line meter, during on-line operation the quality factor $Q_0$ may validated based on system quality factor $Q_D$, which, for example, may derive from the current concentration $\alpha$ and the current driving frequency at least iteratively.

Knowing the current system quality factor $Q_D$, and thus, the current quality factor $Q_0$ of the moving resonator, the equation system, which comprises Eqn. (33) and the first mode equation from Eq. (43), could also solved to obtain concentration $\alpha$, fluid resonator's resonance frequency $f_0$ and liquid density $\rho_L$.

Further, if we assume that the system damping $D_D$ in driving mode is not too high, say $Q_D > 10$, and the ratio of driving and Coriolis frequency stays nearly constant ($\tilde{f}_D/$ $\tilde{f}_C = \tilde{\omega}_D / \tilde{\omega}_C =$ const.), the mass flow error calculated by means of a current Coriolis coupling coefficient representative for coefficient two- or multi phase mixture condition and by means of a reference Coriolis coupling coefficient $c_{CD}$ previously determined for the system under known reference conditions:

$$E_{\dot{m}} = \frac{\tilde{\dot{m}}}{\dot{m}} - 1 \qquad (51)$$

$$= \frac{\tilde{c}_{CD}}{c_{CD}} - 1$$

$$= \frac{l}{4\tilde{\omega}_D \underbrace{A\rho v}_{\dot{m}}} \frac{\int_{-1}^{1} \Im\{\tilde{f}_D(\zeta)\} a_C(\zeta) d\zeta}{\int_{-1}^{1} a'_D(\zeta) a_C(\zeta) d\zeta} - 1.$$

The Coriolis coupling coefficient $c_{CD}$, which is used here as a reference value for the mode coupling in case of homogeneous single-phase media, may calibrate previously under appropriate one-phase condition as discussed above for the quality factor $Q_0$. For the prediction of mass flow errors, Eq. (51), may further simplified as explained for Eq. (33) and (43):

$$E_{\dot{m}} = k_1 \left( -\frac{2\alpha}{1-\alpha} \right) + k_2 r_{1i} \frac{\tilde{f}_i^2}{\tilde{f}_0^2 - \tilde{f}_i^2} \left( 1 - k_1 \frac{2\alpha}{1-\alpha} \right) \ (i = 1 \text{ or } 2). \qquad (52)$$

The great benefit of Eq. (46) and (52) consists in the fact that they do consider both, "bubble effect" and "moving resonator effect", and can be solved during on-line operation of the inline meter.

For the coefficient $k_1$ in Eq. (52) we can assume that $k_1 \approx 1$. Based on numerous calculations and the usage in experiments, surprisingly we have further found that for a real Coriolis mass flow/density meter also the ratio of the mass flow error to the density error uniquely caused by the moving resonator effect is essentially invariant. For most types of Coriolis mass flow/density meters the error coefficient $k_2$ may lie within a range between 1.5 to 5, whereby a value about 2 to 2.5 has always shown very good results in error compensation.

Based on this assumption that coefficients, $k_1$ and $k_2$ could be set to a constant value, we can match Eqn. (46) and (52) to the simple formula:

$$E_{\dot{m}} = k_1 \cdot E_{\rho,1} + k_2 \cdot E_{\rho,2}, \qquad (53)$$

which can be seen as to be a fundamental relation for a multiphase error compensation within inline meters, i.e. a Coriolis flow meters, based on "bubble effect" and MRM as described above. Consequently, if the density errors $E_{\rho,1}$ due to "bubble effect" and $E_{\rho,2}$ due to "moving resonator effect" are determined based on Eqn (46) one can directly derive therefrom the mass flow error and, thus, estimate the true mass flow rate more precisely in a comparatively easy way. Indeed, this important cognition that both error ratios are essentially invariant does not only improve the accuracy of the online compensation substantially, but it may also reduce significantly the computational complexity for the error compensation, which is to be performed in the electronics of the respective inline meter, compared to error compensation based on neuronal networks for example. Further, the complexity of the software to be programmed for the error compensation algorithm can also reduced.

As explained above, the total system damping $D_D$, which is inversely proportional to the total system quality factor $Q_D$, can be estimated from a ratio of the modal component of driving current $I_D$ to the respective modal components of oscillation amplitude $A_D$ of the measuring tube. Therefore, we instead of or in addition to the second mode measurement we can make use of damping measured under the driving mode to provide additional information. Consequently, based on the MRM, we can compute the measurement errors, both for density as shown in Eq. (39) and the mass flow rate as shown in Eq. (51) of multi-phase mixture in different ways. Furthermore, at least said first measurement signal component and said excitation signal may also use for generating the at least one measured value.

Once again, both the bubble effect error and the reduced effective mass effect for the resonator must be considered in mass flow and density measurement under multiphase fluid condition. Knowing concentration $\alpha$ and resonator's frequency $f_0$, beside the density error $E_\rho$ also the mass flow rate $E_{\dot{m}}$ error, which is caused also by both, the "bubble effect" and the "resonator effect", may calculated according to Eq. (46) and (52), respectively. The model of the moving resonator including the "bubble effect" may implemented numerical in a computer algebra system, for instance directly in the above mentioned microcomputer 55. Parameters and constants, which may be used for an exemplar model, are listed in Table 1. Corresponding results for two different gas volume concentrations, $\alpha_1 = 1.5\%$ and $\alpha_2 = 15\%$, as well as two different pressures, $p_1 = 1 \times 10^5$ Pa and $p^2 = 5 \times 10^5$ Pa are shown in Table 2.

TABLE 1

| Parameter set | |
|---|---|
| Parameters | Values |
| Length of the tube: l | 1.5 m |
| Inner radius of the tube: R | 0.05 m |
| Thickness of the tube: h | 0.004 m |
| Young-Modulus of the tube: $E_t$ | $210 \times 10^9$ N/m$^2$ |
| Density of the tube: $\rho_t$ | 8000 kg/m$^3$ |
| Density of liquid: $\rho_l$ | 1000 kg/m$^3$ |
| Sound velocity of liquid: $c_l$ | 1460 m/s |
| Sound velocity of gas: $c_g$ | 340 m/s |
| Adiabatic gas constant: $\gamma$ | 4/3 |
| Quality factor of the resonator: $Q_1$ | 10 |
| Fluid velocity: v | 1 m/s |
| Gas concentration: $\alpha$ | $\alpha_1 = 1.5\%$; $\alpha_2 = 15\%$ |
| Pressure: p | $p_1 = 1 \times 10^5$ Pa; $p_2 = 5 \times 10^5$ Pa |

TABLE 2

| | Calculated results | | | | |
|---|---|---|---|---|---|
| | Parameters | | | | |
| | (0.0, p) | ($\alpha_1$, $p_1$) | ($\alpha_1$, $p_2$) | ($\alpha_2$, $p_1$) | ($\alpha_2$, $p_2$) |
| Sound velocity in the mixture: c | 1460.0 m/s | 94.7 m/s | 209.7 m/s | 32.3 m/s | 72.0 m/s |
| Resonance frequency of the mixture: $f_1$ | 8556.6 Hz | 555.3 Hz | 1228.8 Hz | 189.4 Hz | 522.0 Hz |
| Driving frequency of the system: $f_D$ | 218.6 Hz | 214.4 Hz | 219.4 Hz | 307.8 Hz | 235.6 Hz |
| Quality factor of the system: $\tilde{Q}_D$ | ∞ | 391.8 | 4880.0 | 16.6 | 309.7 |
| Density error: $E_\rho$ | 0.0% | 11.1% | −0.4% | −121.6% | −21.5% |
| Mass flow error: $E_m$ | 0.0% | 27.8% | 2.4% | −70.8% | −4.2% |

Figure 14:
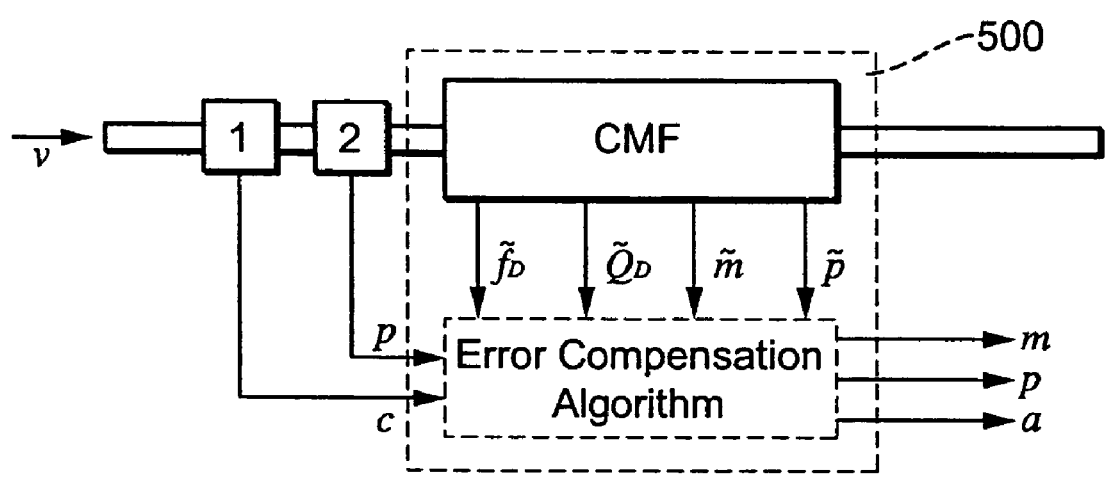
FIG. 14 shows schematically an arrangement for realizing an error compensation according to the invention.

As shown in FIG. 14, the MRM as described above can be utilized to compensate the measurement errors $E_{\dot{m}}$ of Vibratory type inline meters, such as Coriolis meters. Therefore, the following error compensation setup could be used, for example: Import values could be the separately measured mixture sound speed c and measured values of the Coriolis mass flowmeter, such as driving frequency $\tilde{f}_D$, quality factor $\tilde{Q}_D$/damping $\tilde{D}_D$ of the total system within the driving mode, apparent density $\tilde{\rho}$, and apparent mass flow $\tilde{\dot{m}}$. The measured system quality factor $\tilde{Q}_D$ and the measured damping $\tilde{D}_D$ are functions of driving current, especially driving mode related components of the driving current. Knowing the mixture sound speed c with Eq. (16) we can determine the fluid resonator frequency $f_0$. Using Eq. (33) and Eq. (50) the unknown parameters gas volume concentration α and resonator quality factor $Q_0$ are adapted in an iterative procedure. Therefore the differences between true and calculated values of system quality factor $\tilde{Q}_D$ and driving frequency $\tilde{f}_D$ are minimized. Eventually, using Eq. (39) and Eq. (51) the true mass flow $\dot{m}$ and the true mixture density $\rho$ can be determined. As a result, the error compensation algorithm can give the actual mass flow $\dot{m}$, the actual mixture density $\rho$ and the liquid and gas volume concentration α, respectively, in an appropriate accuracy.

An alternative error compensation setup may be given by: By measuring the mixture sound speed c and the pressure p with Eq. (16) the gas volume and/or liquid volume concentration α can be calculated. Alternatively this step can also be done by using an interpolated look up table, which consists of measured or calculated triples (c, p, α). Knowing the mixture sound speed c with Eq. (23) we can determine the resonator frequency $f_0$. Using Eq. (33) the unknown parameter resonator quality factor $Q_0$ could be determined. Therefore, in an iterative procedure the difference between measured/calculated and true system quality factor $\tilde{Q}_D$ may minimize. Finally by using Eq. (39) and Eq. (51) the true mass flow $\dot{m}$ and the true mixture density $\rho$ can be determined. As a result, the error compensation algorithm gives the actual mass flow $\dot{m}$, the actual mixture density $\rho$ and the gas volume concentration α.

Based on either of the above compensation schemes, two- or multimode compensation and/or driving mode damping compensation, the principle unknowns: concentration α and fluid resonator's resonance frequency $f_0$ could be determine during operation of the inline meter. Then corresponding density error $E_\rho$ and mass flow error $E_{\dot{m}}$ may predict based on the MRM.

Figure 15:
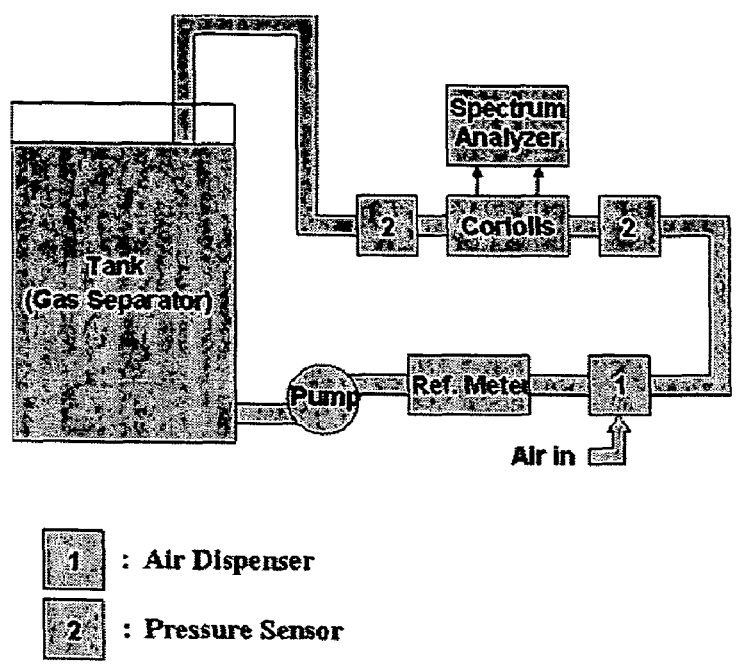
FIG. 15 shows a schematic of an experimental setup for validating error compensation schemes according to the invention.

For the validation of the compensation schemes, a schematic of the experimental setup is depicted in FIG. 15. The facility includes a reference mass flow meter before the air injection point to measure the real mass flow rate. The Coriolis meter used herein for generating experimental data was selected from Series "Promass F DN 50" made from Endress+Hauser Flowtec AG. As known, this Coriolis meter comprises two slightly bent tubes, and is suiteable for use pipe lines with a diameter of about 50 mm. The pressures before and after the Coriolis meter were also recorded to calculate concentration α and the gas volume fraction inside the Coriolis meter, respectively. For resonance frequency measurements for the f2 mode, a spectrum analyzer connected to one of the meter sensors was used. In the experiments, the flow rate was controlled to be about 15000 kg/h, and the pressure inside the meter was around 1.5 bar. The flowing media used herein were water-air mixtures. The experiments were carried out for five different gas volume fractions. Keeping the same flow conditions, we recorded the resonance frequencies $\tilde{f}_1$, $\tilde{f}_2$ for the two selected modes and actual meter readings of flow rate and density respectively.

Figure 18:
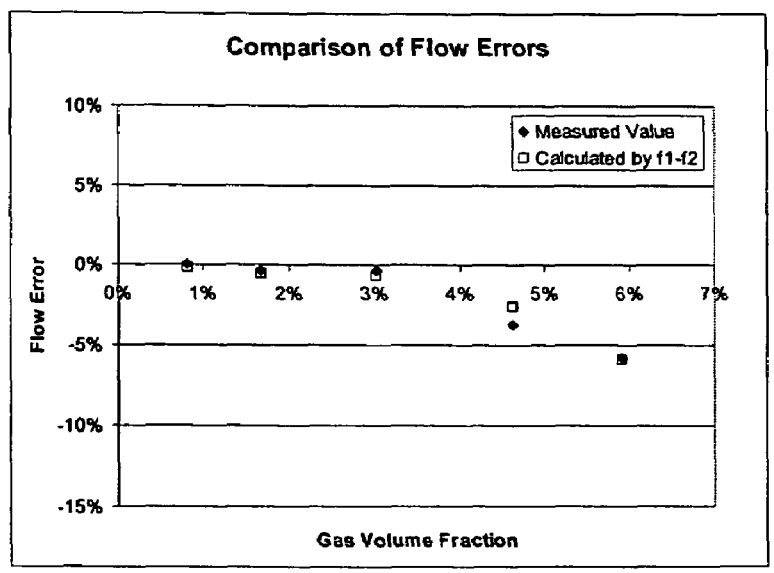
FIG. 18 Comparison of the measured and calculated flow errors.
Figure 19:
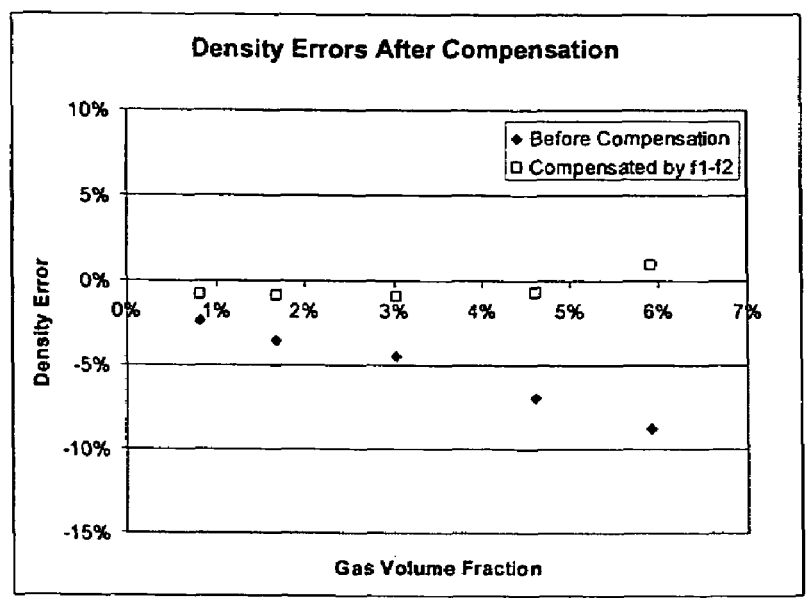
FIG. 19 Density errors with and without compensation.
Figure 20:
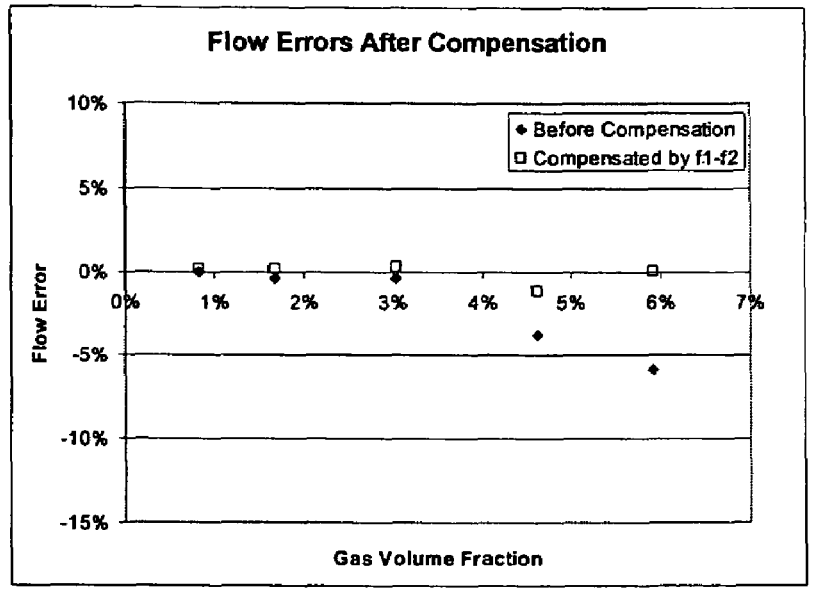
FIG. 20 Mass flow errors with and without compensation.

Filled with pure water, the Coriolis meter may resonate at a frequency about 440 kHz under the f1 mode and at a frequency about 1.340 kHz under the f2 mode, see also FIGS. 18 and 19. In case of two-phase flow, where the gas volume fraction is about 1%, the resonance frequency of the f2 mode shifts to the left about 20 Hz, while the corresponding f1 mode frequency shifts to the right in case of the same two-phase mixture.

Figure 16:
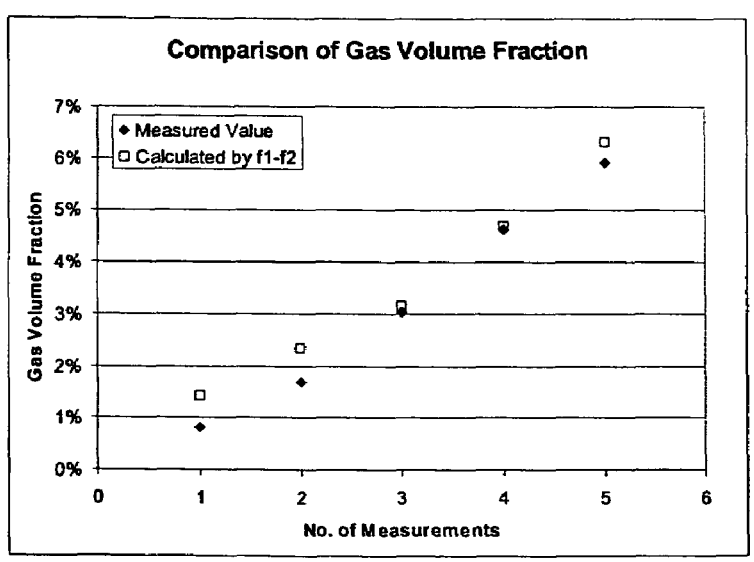
FIG. 16 Comparison of the measured and calculated gas volume fractions.
Figure 17:
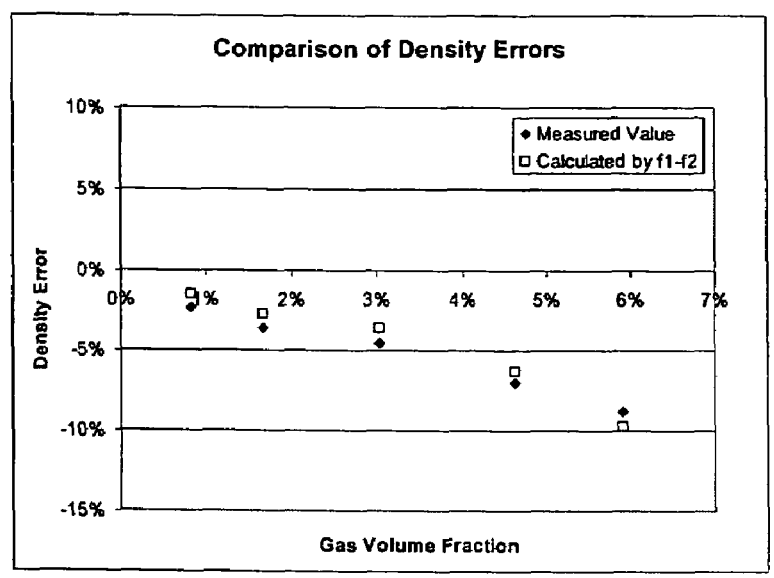
FIG. 17 Comparison of the measured and calculated density errors.

As explained in above, the concentration α and the resonance frequency $f_0$ of the fluid resonator could be calculated by knowing the disturbed resonance frequencies $\tilde{f}_1$, $\tilde{f}_2$ for the f1 mode and the f2 mode, respectively, then the corresponding mass flow error $E_{\dot{m}}$ and density error $E_\rho$ could be estimated accordingly. FIG. 16 shows the comparison of the measured gas volume fractions and the estimated ones according to the two-mode compensation scheme. It can be seen that the calculated values from the two-mode compensation scheme are qualitatively correct. FIGS. 17 and 18 illustrate the comparisons for the measured and calculated density errors $E_\rho$ and the measured and calculated mass flow errors $E_{\dot{m}}$. Same as in FIG. 16, the measured values and the estimated values are compared in each figure. The two-mode compensation scheme appears to capture the trend of the mass flow errors $E_{\dot{m}}$ and density errors $E_\rho$ under real conditions. To enable an overview of this compensation scheme, FIGS. 17 and 18 also show the corrected values over concentration α, represented by the gas volume fraction, vs. uncorrected values. A significant improvement of the measurements for two-phase flow is achieved, where the errors $E_{\dot{m}}$, $E_\rho$ of both density and mass flow are controlled within±1%, while the uncorrected errors can reach −9%.

Figure 23:
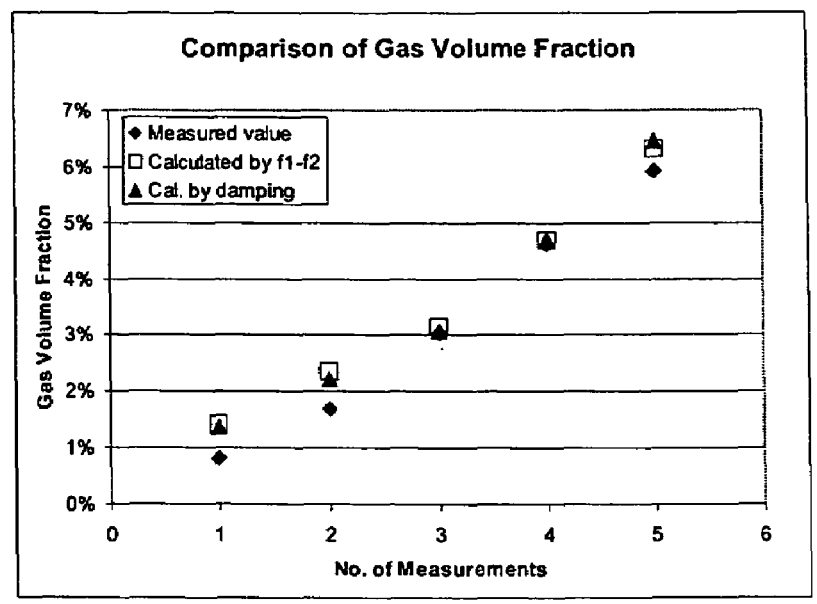
FIG. 23 Comparison of the measured and calculated gas volume fractions.
Figure 24:
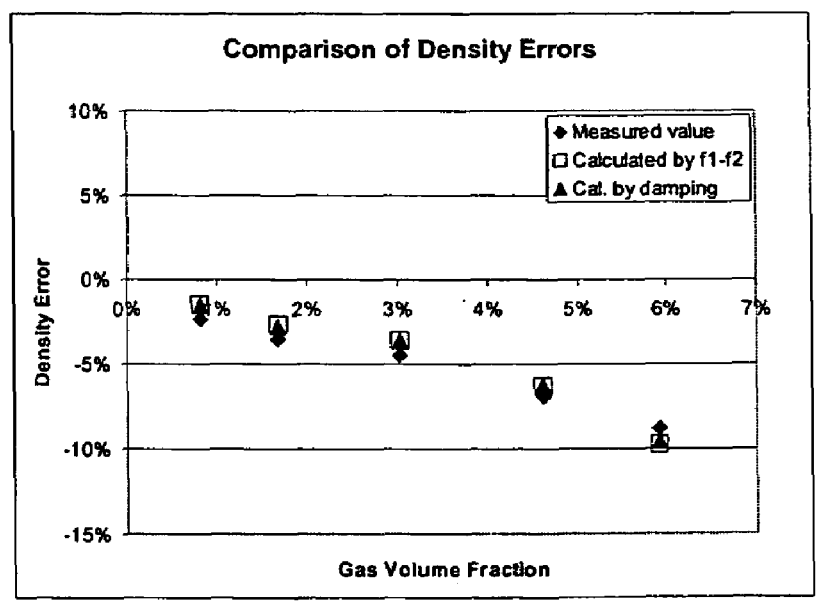
FIG. 24 Comparison of the measured and calculated density errors.
Figure 25:
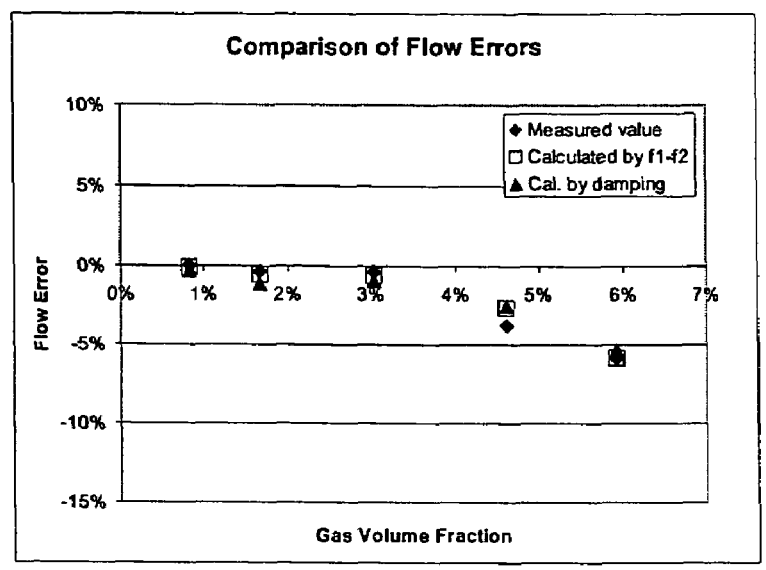
FIG. 25 Comparison of the measured and calculated flow errors.

FIGS. 23, 24, and 25 depict the comparisons between measured errors and the corresponding predictions by the driving mode damping compensation scheme, where the value of fluid resonator's quality factor $Q_0$ is taken to be 0.6.

The predictions from the two-mode compensation scheme are also included for comparison. It can be seen that the compensation scheme based on damping can also give a good prediction to the real measure values.

Figure 26:
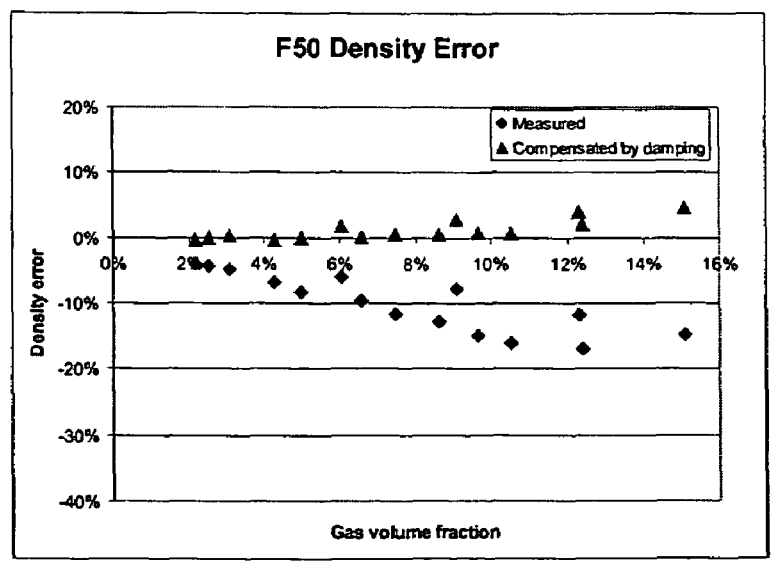
FIG. 26 Density errors with and without compensation.
Figure 27:
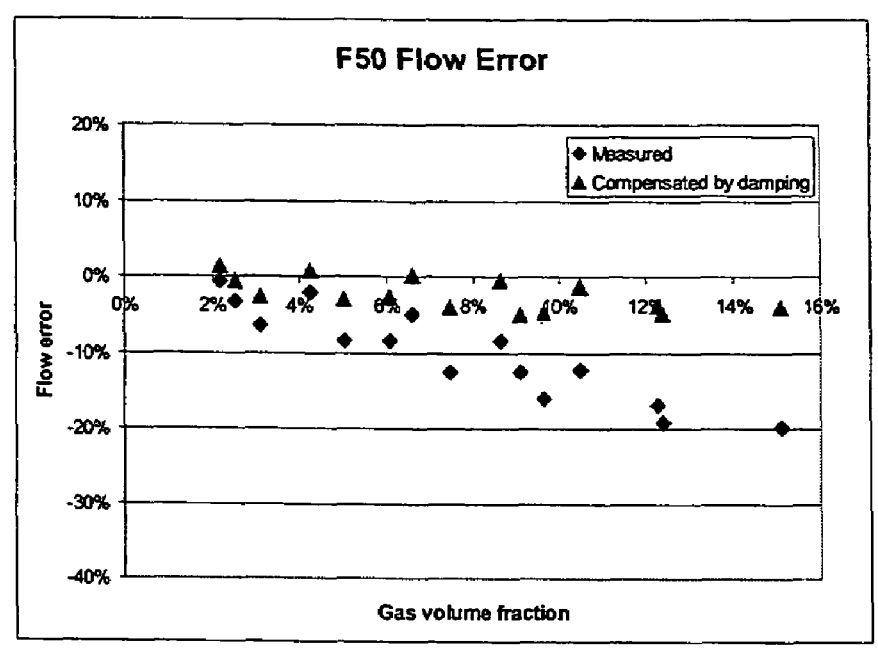
FIG. 27 Mass flow errors with and without compensation.
Figure 28:
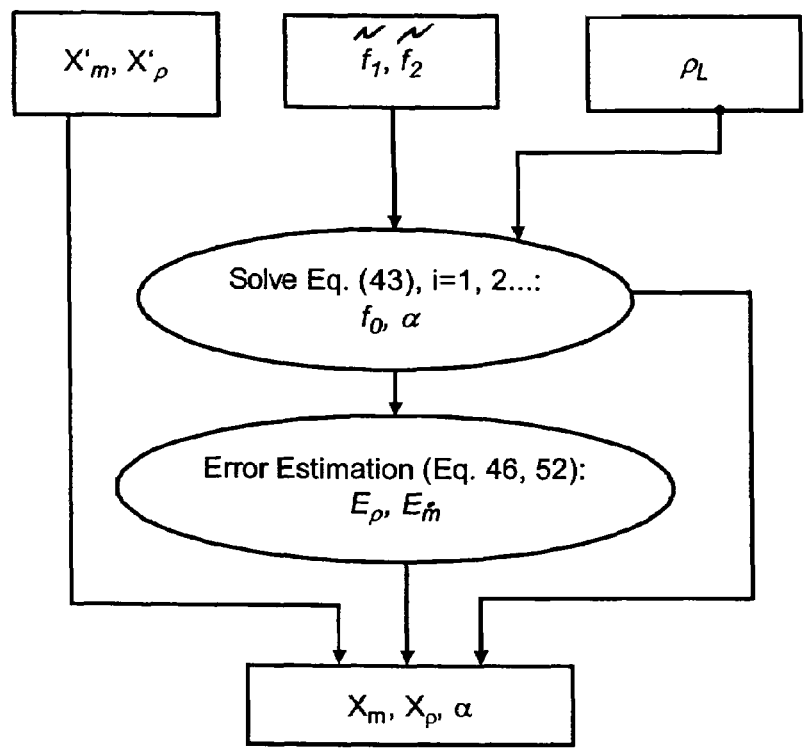
FIG. 28 Scheme of two-mode compensation by knowing liquid density.
Figure 29:
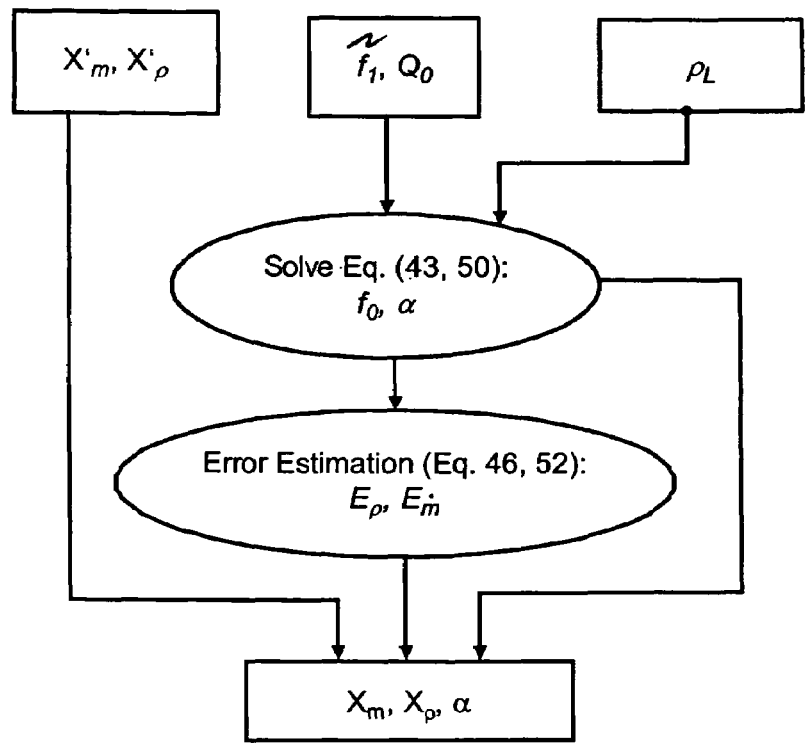
FIG. 29 Schematic of driving mode+damping compensation by knowing liquid density.
Figure 30:
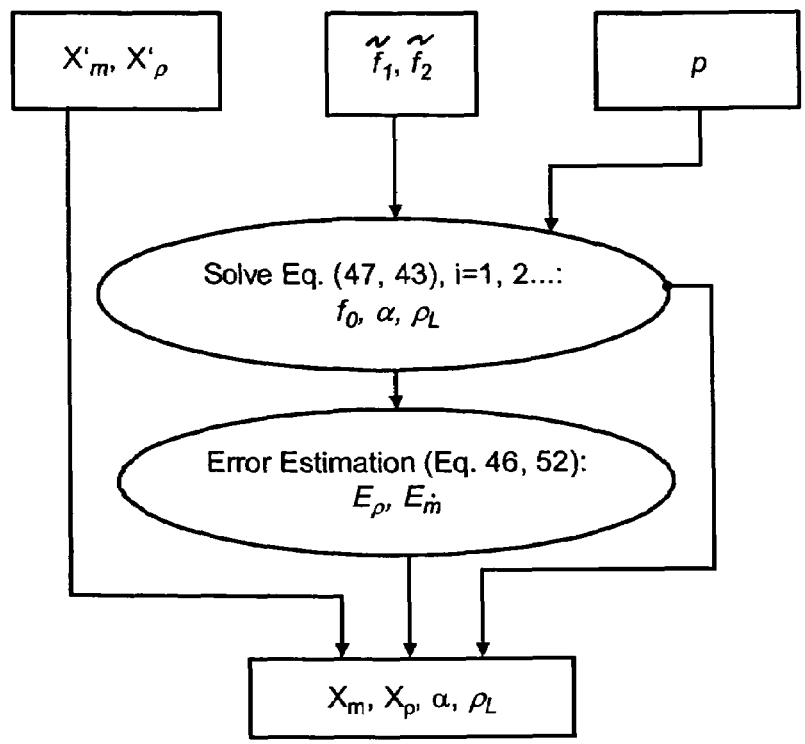
FIG. 30 Schematic of two-mode compensation without knowing liquid density.
Figure 31:
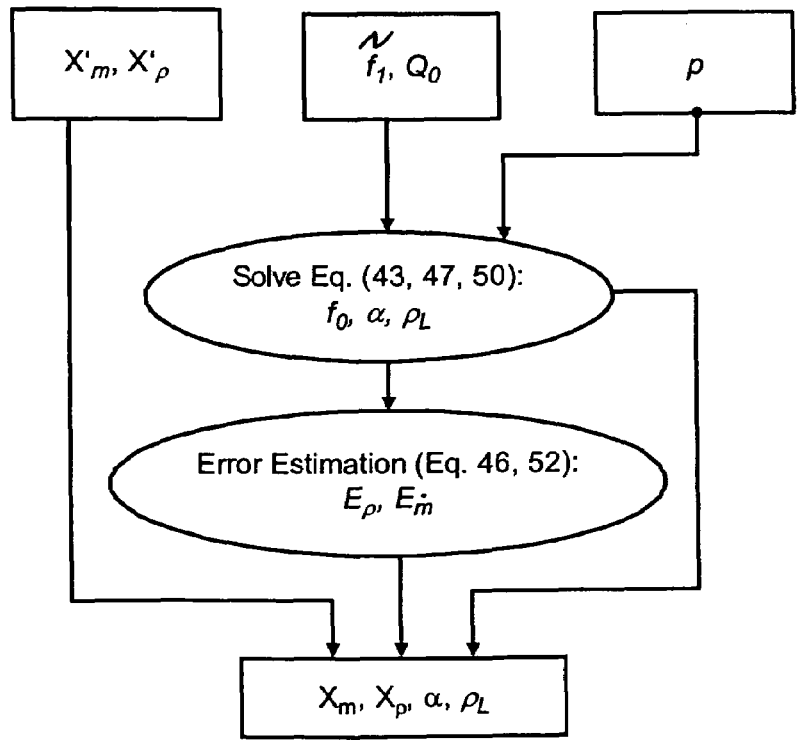
FIG. 31 Schematic of driving mode+damping compensation without knowing liquid density.

FIGS. 26 and 27 show another experiment with the same Coriolis meter as before (PROMASS F DN50), but different flow conditions. The flow rates vary from 10000 to 15000 kg/h, and pressures vary from 1.8 to 2.2 bar. The quality factor $Q_0$ of the fluid resonator is still taken to be 0.6. From a comparison of these two figures with FIGS. 23 and 24, respectively, it can be seen that the compensation scheme based on damping shows also a good performance for the error correction.

Finally, FIG. 28 to 31 illustrate in intuitive way sequence diagrams of the above described compensation schemes for two different conditions: with and without knowing the liquid phase density $\rho_L$, respectively.

In most applications, the users of Coriolis meters never know the gas volume fraction in the processing liquid. Even if it is known, it is fairly difficult to determine the resonance frequency of the mixture inside the measurement tube because firstly, one has to estimate the pressure in the tube; secondly, there is another uncertainty that the mixture is usually not ideally homogeneous, which impacts the resonance frequency. The general steps for realizing that two mode compensation scheme may briefly summarize as follows: The manufacturer provides the first mode and the second mode resonance frequencies of the at least one measurement tube for pure air and pure water respectively. During commissioning these frequencies can also be measured easily with the installed inline measuring device on-site. Based on the above frequencies, the characteristics of the resonance of the measurement tube for different loads could be determined. The disturbed resonance frequencies $\tilde{f}_i$ of each of the selected modes i are measured when the meter encounters two-phase or multi-phase flows. The concentration $\alpha$ and the resonance frequency $f_0$ of the resonator are computed based on Eq. (44) and (45), respectively. Then the density error and mass flow rate error are estimated based on MRM considering both, "bubble effect" and "moving resonator effect". Eventually, the target measurement values of the inline measuring device, i.e. mass flow rate, density, concentration etc., are outputted in corrected form.

An advantage of the two-mode compensation scheme is that it skips these difficulties and directly evaluates the gas volume fraction and the resonance frequency by measuring the two resonance frequencies of the two modes, without additional devices such as the sound speed sensor and the pressure sensor. Theoretical analysis and experimental data demonstrate the validity of the two mode compensation scheme. As discussed with FIGS. 17 and 18, both the density error and the mass flow error are compensated to a relatively accurate range. Additionally, using at least one of the schemes the users can perceive the presence of the gas and liquid phase, respectively, and have an idea how much fraction it occupies. Therefore, the two- or multi mode compensation scheme and the damping mode scheme may improve the accuracies of inline measuring devices, especially Coriolis mass flow meters and density meters, and may extend theirs range to applications for two-phase or multi-phase flows.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected. However, it should be noted that the compensation schemes discussed herein separately may combine with each other to improve the accuracy and/or robustness of the error compensation. Moreover, it lies also within the scope of the invention to convert one or more of the equations described above into appropriate program codes, which may executable with the microcomputer 55 during on-line operation of the inline measuring device. In addition, using an inline measuring device according to the embodiment shown in FIG. 1 to 6 it may be advantageously to combine one or more of the above mentioned compensation schemes with the dual mode multiphase error compensation scheme as disclosed in WO-A 05/090901 or WO-A 05/090926 to get more information about current mixture within the measuring tube and to further improve the error compensation under multi phase flow condition. Furthermore, a person skilled in the art will recognize that not only the type of measuring tube arrangement could be different from the embodiments exemplarily described above, but also the optimal eigenmodes to be selected for the inventive error compensation may depend on the type of transducer actual used and, thus, may be different from the eigenmodes, which are exemplarily selected in the embodiments to explain the invention.

What is claimed is:

1. A method for measuring at least one parameter of a two-, or multi-phase mixture flowing in a pipeline, by means of an inline measuring device including a measurement transducer of the vibration-type, and a measuring device electronics electrically coupled with said measurement transducer, said mixture consisting of at least one first mixture phase and at least one second mixture phase, said method comprising steps of:

conducting the mixture to be measured within at least one measuring tube of said measurement transducer, with the measuring tube being in communication with the pipeline;

feeding an exciter arrangement with an excitation signal, said exciter arrangement being adapted to impart motion to said at least one measuring tube and vibrating said at least one measuring tube, said excitation signal including at least a first excitation signal component corresponding to a first one of a plurality of natural eigenmodes of said at least one measuring tube conducting said mixture;

sensing vibrations of the measuring tube conducting said mixture and generating at least one oscillation measurement signal representing oscillations of the vibrating measuring tube, said at least one oscillation measurement signal including at least a first measurement signal component corresponding to said first one of said plurality of natural eigenmodes of the at least one measuring tube conducting said mixture, using at least said first measurement signal components and said excitation signal for generating at least one measured value representing said at least one parameter to be measured.

2. The method as claimed in claim 1, further comprising the steps of:

determining from said excitation signal a current value representing a current of at least a portion of said excitation signal; and using said current value for generating said measured value.

3. The method as claimed in claim 1, further comprising the steps of:

selecting from said excitation signal said first excitation signal component; and using at least said first excitation signal component for generating said at least one measured value.

4. The method as claimed in claim 3, further comprising the steps of:

determining from said excitation signal at least one current value representing at least a current of said first excitation signal component; and using said at least one current value for generating said measured value.

5. An inline measuring device, especially a Coriolis mass-flow/density measuring device and/or a viscosity measuring device, for the measurement of at least one parameter, especially a mass flow rate, $\dot{m}$, a density, $\rho$, and/or a viscosity, $\eta$, of a two-phase or a multi-phase mixture, flowing in a pipeline, which inline measuring device comprises:

a vibratory-type transducer, measuring device electronics electrically coupled with said vibratory-type transducer, said vibratory-type transducer including at least one measuring tube inserted into the course of the pipeline, said at least one measuring tube serving for conducting the mixture to be measured, and said at least one measuring tube communicating with the connected pipeline;

an exciter arrangement acting on the measuring tube for causing the at least one measuring tube to vibrate;

a sensor arrangement for sensing vibrations of said at least one measuring tube and for delivering at least one oscillation measurement signal representing oscillations of said at least one measuring tube, and said measuring device electronics delivering, at least at times, an excitation current driving the exciter arrangement.

6. An inline measuring device as claimed in claim 5, wherein said measuring device electronics is adapted to execute at least one of the steps of generating said at least one measured value, and generating said at least one concentration value.

7. Use of an inline measuring device as claimed in claim 5 for measuring at least one parameter, especially a mass flow rate, a density and/or a viscosity, of a two, or multi phase mixture flowing in a pipeline, especially a liquid-gas mixture.

8. A method for determining a concentration of at least one phase of a mixture consisting of at least one first mixture phase and at least one second mixture phase, said mixture flowing in a pipeline, which is in communication with at least one measuring tube of an inline measuring device, said method comprising the steps of:

conducting said mixture within said at least one measuring tube;

causing at least one of said first and second mixture phases, currently within said at least one measuring tube, to move relative to said at least one measuring tube, said relative motions of said at least one of the first and second mixture phases stimulating said at last one measuring tube to vibrate within at least one of a plurality of instantaneous natural eigenmodes of said at least one measuring tube conducting said mixture;

sensing vibrations of said at least one measuring tube and generating at least one oscillation measurement signal representing oscillations of the vibrating measuring tube, said at least one oscillation measurement signal including at least one signal component corresponding to one of a plurality of natural eigenmodes of said at least one measuring tube conducting said mixture, said natural eigenmode being stimulated due to said relative motion of said at least one of the first and second mixture phases to said measuring tube; and using said at least one signal component of the oscillation measurement signal, for generating at least one concentration value representing a concentration of at least one of said first mixture and said second phases within the mixture.

9. The method as claimed in claim 8, further comprising a step of:

causing said at least one first mixture phase and said at least one second mixture phase, currently within said measuring tube, to move relative to each other.

10. The method as claimed in claim 9, wherein the step of causing relative motion of said at least one first mixture phase and said at least one second mixture phase comprises a step of flowing said mixture through said at least one measuring tube.

11. The method as claimed in claim 10, wherein the relative motions of said at least one first mixture phase and said at least one second mixture phase stimulating said at last one measuring tube to vibrate within said at least one of a plurality of instantaneous natural eigenmodes of said at least one measuring tube conducting said mixture.

12. The method as claimed in claim 8, wherein the steps of sensing vibrations of said at least one measuring tube and generating at least one oscillation measurement signal representing oscillations of the vibrating said at least one measuring tube comprise a step of using a sensor arrangement responsive to vibrations of said at least measuring tube, said sensor arrangement being electrically coupled with a measuring device electronics of said inline measuring device.

13. The method as claimed in claim 8, wherein the step of causing at least one of said first and second mixture phases, currently within said at least one measuring tube, to move relative to said at least one measuring tube comprises a step of flowing said mixture through said at least one measuring tube.

14. The method as claimed in claim 8, further comprising a step of:

feeding an exciter arrangement with an excitation signal, said exciter arrangement being electrically coupled with measuring device electronics of said inline measuring device, and said exciter arrangement being adapted to impart motion to said at least one measuring tube.

15. The method as claimed in claim 14, further comprising a step of: using said exciter arrangement for vibrating said at least one measuring tube.

16. The method as claimed in claim 14, wherein the step of causing relative motion of said at least one first mixture phase and said at least one second mixture phase comprises a step of using said exciter arrangement for vibrating said at least one measuring tube.

17. The method as claimed in claim 14, further comprising a step of:

using, at least partially, said excitation signal for generating said at least one measured value.

18. The method as claimed in claim 17, further comprising the steps of:

determining from said excitation signal a current value representing a current of at least a portion of said excitation signal; and using said current value for generating said measured value.

19. The method as claimed in claim 17, further comprising the steps of:
selecting from said excitation signal said first excitation signal component; and
using at least said first excitation signal component for generating said at least one measured value.

20. The method as claimed in claim 19, further comprising the steps of:
determining from said excitation signal at least one current value representing at least a current of said first excitation signal component; and
using said at least one current value for generating said measured value.

21. The method as claimed in claim 8, further comprising the steps of:
using an exciter arrangement for vibrating said at least one measuring tube conducting said mixture, said exciter arrangement being electrically coupled with a measuring device electronics of said inline measuring device, and said exciter arrangement being adapted to impart motion to said at least one measuring tube; and
feeding said exciter arrangement with an excitation signal being substantially devoid of any excitation signal components, which correspond to said natural eigenmode stimulated due to said relative motion of said first mixture and second mixture phases within said at least one measuring tube, and/or which would excite said natural eigenmode via said exciter arrangement.

22. The method as claimed in claim 21, further including a step of: flowing said mixture through said at least one measuring tube, wherein the step of vibrating said at least one measuring tube includes, at least temporary, a step of driving said measurement tube to oscillate within a driving mode for causing Coriolis forces within the flowing mixture.

23. The method as claimed in claim 8, wherein one of said at least one first mixture and second mixture phases of the mixture is liquid.

24. The method as claimed in claim 8, wherein one of said at least one first mixture and second mixture phases of the mixture is solid.

25. The method as claimed in claim 8, wherein said solid one of said phases is granular.

26. The method as claimed in claim 8, wherein said at least one fluid phase of the mixture is gaseous.

27. The method as claimed in claim 8, wherein said mixture is selected from a group consisting of: powder, granulate, aerated oil, aerated water, aerosol, spray, slurry, pulp, paste.

28. Use of the method as claimed in claim 8 for generating, based on said concentration value, at least one further measured value representing a further parameter, especially a mass flow rate, $\overset{m}{}$, a density, $\rho$, and/or a viscosity, $\eta$, of said mixture flowing in the pipeline.

29. An inline measuring device, especially a Coriolis mass-flow/density measuring device and/or a viscosity measuring device, for the measurement of at least one parameter, especially a mass flow rate, $\overset{m}{}$, a density, $\rho$, and/or a viscosity, $\eta$, of a two-phase or a multi-phase mixture, flowing in a pipeline, which inline measuring device comprises:
a vibratory-type transducer;
measuring device electronics electrically coupled with said vibratory-type transducer, said vibratory-type transducer including at least one measuring tube inserted into the course of the pipeline, said at least one measuring tube serving for conducting the mixture to be measured, and said at least one measuring tube communicating with the connected pipeline;
an exciter arrangement acting on said at least one measuring tube for causing the at least one measuring tube to vibrate; and
a sensor arrangement for sensing vibrations of the at least one measuring tube and for delivering at least one oscillation measurement signal representing oscillations of said at least one measuring tube, wherein said measuring device electronics delivering, at least at times, an excitation current driving the exciter arrangement.

30. An inline measuring device as claimed in claim 29, wherein the measuring device electronics is adapted to execute at least one of the steps of generating said at least one measured value, and generating said at least one concentration value.

31. Use of an inline measuring device as claimed in claim 29 for measuring at least one parameter, especially a mass flow rate, a density and/or a viscosity, of a two, or multi phase mixture flowing in a pipeline, especially a liquid-gas mixture.

* * * * *